US009821669B2

(12) United States Patent
Tanabe

(10) Patent No.: US 9,821,669 B2
(45) Date of Patent: Nov. 21, 2017

(54) ELECTRIC VEHICULAR CONNECTOR AND VEHICULAR POWER SUPPLY DEVICE

(71) Applicant: Panasonic Intellectual Property Management Co., Ltd., Osaka (JP)

(72) Inventor: Mitsuru Tanabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 305 days.

(21) Appl. No.: 14/778,653

(22) PCT Filed: Mar. 25, 2014

(86) PCT No.: PCT/JP2014/001717
§ 371 (c)(1),
(2) Date: Sep. 21, 2015

(87) PCT Pub. No.: WO2014/156131
PCT Pub. Date: Oct. 2, 2014

(65) Prior Publication Data
US 2016/0052411 A1     Feb. 25, 2016

(30) Foreign Application Priority Data

Mar. 28, 2013  (JP) ................................ 2013-069920

(51) Int. Cl.
*H02J 7/14* (2006.01)
*B60L 11/18* (2006.01)
(Continued)

(52) U.S. Cl.
CPC ........... *B60L 11/1811* (2013.01); *B60L 3/003* (2013.01); *B60L 3/0023* (2013.01); *B60L 3/0069* (2013.01);
(Continued)

(58) Field of Classification Search
CPC .. H02J 7/02; H02J 7/004; H02J 7/0029; H02J 7/0031; B06L 11/1811; B06L 11/1812;
(Continued)

(56) References Cited

U.S. PATENT DOCUMENTS 8,368,352 B2   2/2013  Ichikawa et al.
2011/0121779 A1   5/2011  Ichikawa et al.
(Continued)

FOREIGN PATENT DOCUMENTS

CA   2743765 A1 *  6/2009  .......... B60L 11/1818
EP   2 559 588 A1    2/2013
(Continued)

OTHER PUBLICATIONS

Extended European Search Report for corresponding European Application No. 14774566.5 dated Jun. 20, 2016.
(Continued)

*Primary Examiner* — Drew A Dunn
*Assistant Examiner* — Michael Dibenedetto
(74) *Attorney, Agent, or Firm* — Renner Otto Boisselle & Sklar, LLP

(57) ABSTRACT

The electric vehicular connector includes: a connection terminal block including a primary power transmission terminal to be electrically connected to a first power terminal of a power converter; a plug including a secondary power transmission terminal to be electrically connected to a second power terminal of an inlet of an electric vehicle; a breaker which is connected between the primary power transmission terminal and the secondary power transmission terminal and has a closed state of electrically interconnecting the primary power transmission terminal and the secondary power transmission terminal and an open state of electrically separating the primary power transmission terminal and the secondary power transmission terminal from
(Continued)

each other; and a breaker controller configured to set the connector-side breaker in the closed state during a normal state and to set the connector-side breaker in the open state during an abnormal state in which abnormality occurs in the electric vehicle.

6 Claims, 10 Drawing Sheets

(51) Int. Cl.
*B60L 3/00* (2006.01)
*B60L 3/04* (2006.01)
*H02J 7/00* (2006.01)
*H02J 7/02* (2016.01)

(52) U.S. Cl.
CPC ............ *B60L 3/04* (2013.01); *B60L 11/1812* (2013.01); *B60L 11/1818* (2013.01); *B60L 11/1824* (2013.01); *B60L 11/1838* (2013.01); *B60L 11/1846* (2013.01); *H02J 7/0004* (2013.01); *H02J 7/0031* (2013.01); *H02J 7/02* (2013.01); *B60L 2230/16* (2013.01); *B60L 2240/36* (2013.01); *B60L 2240/525* (2013.01); *B60L 2240/527* (2013.01); *B60L 2240/529* (2013.01); *Y02T 10/7005* (2013.01); *Y02T 10/7088* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............ B06L 11/1818; B06L 11/1838; B60L 2440/529; B60L 2440/547; B60L 3/04; B60L 3/0069
USPC .......................................................... 320/109
See application file for complete search history.

(56) References Cited

U.S. PATENT DOCUMENTS

| | | | |
|---|---|---|---|
| 2011/0204849 A1 | 8/2011 | Mukai et al. | |
| 2012/0274278 A1* | 11/2012 | Igata ................... | H04B 3/542 320/109 |
| 2013/0082663 A1 | 4/2013 | Mori et al. | |
| 2013/0162208 A1* | 6/2013 | Ohnuki ............... | B60L 11/1803 320/109 |
| 2013/0300429 A1* | 11/2013 | Jefferies ............... | B60L 3/0069 324/511 |
| 2014/0091764 A1* | 4/2014 | Kinomura ........... | B60L 11/1818 320/109 |
| 2014/0184141 A1* | 7/2014 | Loftus ................. | B60L 11/1818 320/104 |
| 2014/0191720 A1* | 7/2014 | Sugiyama ............ | B60L 3/0069 320/109 |
| 2014/0268473 A1* | 9/2014 | Hassan-Ali ......... | B60L 11/1818 361/179 |

FOREIGN PATENT DOCUMENTS

| | | | | |
|---|---|---|---|---|
| JP | 2010-035277 A | | 2/2010 | |
| JP | 2010-110055 A | | 5/2010 | |
| JP | 2012-070577 A | | 4/2012 | |
| JP | 2012-162176 A | | 8/2012 | |
| JP | 2013-008466 A | | 1/2013 | |
| JP | 2013008466 A | * | 1/2013 | |
| JP | 2013-031348 A | | 2/2013 | |
| WO | WO 2010/113936 A1 | | 10/2010 | |
| WO | WO 2010113936 A1 | * | 10/2010 | ............ B60L 3/0023 |
| WO | WO 2009070334 A8 | * | 12/2010 | ........... B60L 11/1818 |
| WO | WO 2012/107820 A2 | | 8/2012 | |
| WO | WO 2013/018738 A1 | | 2/2013 | |
| WO | WO 2013018738 A1 | * | 2/2013 | ............ H01M 10/44 |

OTHER PUBLICATIONS

International Search Report for corresponding International Application No. PCT/JP2014/001717 dated May 13, 2014.
Form PCT/ISA/237 for corresponding International Application No. PCT/JP2014/001717 dated May 13, 2014.

* cited by examiner

ELECTRIC VEHICULAR CONNECTOR AND VEHICULAR POWER SUPPLY DEVICE

TECHNICAL FIELD

The present invention relates to electric vehicular connectors and vehicular power supply devices, and in particularly relates to an electric vehicular connector and a vehicular power supply device for charging, or charging-discharging on storage batteries of electric vehicles.

BACKGROUND ART

Recently, electric vehicles which are less in harmful exhaust emission and eco-friendly, such as electric drive vehicles (EV) and plug-in hybrid electric vehicles (PHEV) have been put on the market. Further, vehicular power supply devices for charging, or charging-discharging on storage batteries of electric vehicles are gradually spreading.

As shown in FIG. 7, a vehicular power supply device for charging electric vehicles includes a power converter 101 (charger) for outputting charge power to charge a storage battery B2 included in an electric vehicle C2, and an output terminal of the power converter 101 is connected to a first end of an electric cable 102. A second end of the electric cable 102 is connected to a connector 103, and this connector 103 is to be removably connected to an inlet 104 provided to the electric vehicle C2.

Further, the power converter 101 supplies charge power to the storage battery B2 of the electric vehicle C2 through the electric cable 102 and the connector 103.

Note that, there has been proposed the CHAdeMO standard for DC charging systems for electric vehicles, and the CHAdeMO standard defines an interface shown in FIG. 8.

The electric cable 102 in conformity with the CHAdeMO standard includes two power supply lines Wp101 and Wp102 for supplying charge power, five analog lines Wa101 to Wa105, and two CAN communication lines Wc101 and Wc102.

The power converter 101 and the electric vehicle C2 are connected by way of the electric cable 102. Note that, a circuit ground of the power converter 101 and a circuit ground of the electric vehicle C2 are interconnected with the analog line Wa105.

FIG. 9 is arrangement of pins of the connector 103 corresponding to the power supply lines Wp101 and Wp102, the analog lines Wa101 to Wa105, and the CAN signal lines Wc101 and Wc102. In FIG. 9, the pins Pp101 and Pp102 correspond to the power supply lines Wp101 and Wp102 respectively, the pins Pa101 to Pa105 correspond to the analog lines Wa101 to Wa105 respectively, and the pins Pc101 and Pc102 correspond to the CAN signal lines Wc101 and Wc102 respectively.

The power converter 101 includes a diode D101 connected in series with an output terminal for charge power.

The electric vehicle C2 includes a vehicle-side breaker M100 for allowing or prohibiting supply of charge power to the storage battery B2 through the power supply lines Wp101 and Wp102. When a control relay 211 is turned on or off, the vehicle-side breaker M100 is excited or not excited, and thereby is turned on or off.

The power converter 101 generates a control voltage Vcc10 (DC 12 V), and this control voltage Vcc10 is supplied to the electric vehicle C2 through a relay 201 of the power converter 101 and the analog line Wa101.

While the control relay 211 of the electric vehicle C2 is turned on, the control voltage Vcc10 operates the vehicle-side breaker M100. When the control voltage Vcc10 is supplied from the power converter 101 to the electric vehicle C2, the vehicle-side breaker M100 is turned on (closed).

While the power converter 101 and the electric vehicle C2 are not interconnected by the electric cable 102, the drive power is not supplied to the vehicle-side breaker M100, and therefore a contact device is not turned on.

A charging flow is started when the power converter 101 accepts charge operation conducted by a user.

The power converter 101 which has accepted the charge operation turns on the relay 201, and thus the control voltage Vcc10 is supplied from the power converter 101 to the electric vehicle C2 through the analog line Wa101, and this leads to excitation of a photocoupler PC21.

As a result, the electric vehicle C2 acknowledges that the charge operation has been started, and transmits parameters including maximum voltage and battery capacity of the storage battery B2 to the power converter 101 via CAN (Controller Area Network) communication by way of the CAN signal lines Wc101 and Wc102.

The power converter 101 sends data including maximum output voltage and maximum output current to the electric vehicle C2 via CAN communication.

The electric vehicle C2 checks compatibility of the power converter 101, and subsequently turns on a transistor Tr21 to excite the photocoupler PC11 of the power converter 101, thereby sending a notice of start of charging to the power converter 101 through the analog lines Wa104.

The power converter 101 acknowledges that charge is allowed by the electric vehicle C2, and then locks the connector 103 to the inlet 104 and performs insulation test for detecting abnormality such as short circuiting and ground fault. After completion of the insulation test, the power converter 101 turns on a relay 202 to excite the photocoupler PC22 of the electric vehicle C2, thereby sending, to the electric vehicle C2 through the analog line Wa102, a notice that charge is ready.

In the electric vehicle C2, the control relay 211 is turned on and thereby the vehicle-side breaker M100 is turned on. Thereafter, the electric vehicle C2 sends a chargeable maximum current value to the power converter 101 via CAN communication every 0.1 seconds.

The power converter 101 performs constant current control to supply charge current with a value equal to the maximum current value.

During charging, the electric vehicle C2 monitors a state of the storage battery B2 and a value of charge current. When abnormality is detected, supply of charge current can be stopped.

When detecting abnormality, the electric vehicle C2 stops supply of charge current by:

(1) sending, to the power converter 101 via CAN communication, instructions to set an output current to zero;

(2) sending an error signal to the power converter 101 via CAN communication, (3) turning off the transistor Tr21 to send an analog signal indicative of prohibiting of charge to the power converter 101; and (4) turning off the control relay 211 to turn off the vehicle-side breaker M100.

Additionally, the power converter 101 also monitors currents, voltages, and temperatures of circuits thereof. When any of the currents, the voltages, and the temperatures exceeds a limited value, the power converter 101 sends an error signal to the electric vehicle C2 via CAN communication, thereby stopping supply of charge power.

At the time of end of charge, instructions to set current to zero are sent from the electric vehicle C2 to the power converter 101 via CAN communication. After the charge current becomes zero, the vehicle-side breaker M100 is turned off. Further, the electric vehicle C2 turns off the transistor Tr21, thereby outputting an analog stop signal to the power converter 101.

The power converter 101 confirms that the output current is zero, and then turns off the relays 201 and 202.

When the connector 103 of the power converter 101 is connected to the inlet 104 of the electric vehicle C2, a control voltage Vcc20 generated by the electric vehicle C2 causes a flow of an analog signal for connector connection confirmation in the analog line Wa103. The analog signal for connector connection confirmation excites a photocoupler PC23 of the electric vehicle C2, and therefore the electric vehicle C2 can confirm that the connector 103 is connected to the inlet 104.

Further, as shown in FIG. 10, the power converter 101 includes a ground fault detector 101b provided to an AC power line on an input side of the electric conversion circuit 101a performing AC/DC conversion, and a ground fault detector 101c provided to a DC power line on an output side of the electric conversion circuit 101a.

Not only when ground fault of the AC power line is detected but also when ground fault of the DC power line is detected, the power converter 101 separates the output terminal for charge power, and thus safety is ensured.

Note that, there has been proposed other charge systems for electric vehicles in conformity with the Combo standard. An electric cable of the Combo standard includes two power supply lines for supplying AC charge power, other two power supply lines for supplying DC charge power, and three analog lines for transmitting control signals.

FIG. 11 is arrangement of pins of a connector 203 of the Combo standard. Pins Pp201 and Pp202 correspond to the two power supply lines for supplying AC charge power. Pins Pp203 and Pp204 correspond to the two power supply lines for supplying DC charge power. Pins Pa201 to Pa203 correspond to the analog lines.

As described above, there have been proposed various methods for the charge systems of electric vehicles. Additionally, there has been proposed a configuration in which a connector-side breaker is provided in a connector so as to break power supply paths even when welding in a vehicle-side breaker is caused by some factors (e.g., see document 1 [JP 2013-31348 A]).

In the aforementioned document 1, when charge current becomes excess due to short circuiting or the like, the connector-side breaker is turned off and thereby the power supply paths are broken. In summary, the configuration disclosed in document 1 is not for turning off the connector-side breaker in response to abnormality of electric vehicles. Therefore, even if abnormality occurs in the electric vehicle and this leads to welding in the vehicle-side breaker, the configuration disclosed in document 1 fails to turn off the connector-side breaker.

SUMMARY OF INVENTION

In view of the above insufficiency, the present invention has aimed to propose an electric vehicular connector and a vehicular power supply device which are capable of turning off a connector-side breaker in response to occurrence of abnormality in an electric vehicle.

The electric vehicular connector of the first aspect in accordance with the present invention includes a connection terminal block, a plug, a connector-side breaker, and a breaker controller. The connection terminal block includes a primary power transmission terminal to be electrically connected to a first power terminal of a power converter. The plug includes a secondary power transmission terminal to be electrically connected to a second power terminal of an inlet of an electric vehicle. The connector-side breaker is connected between the primary power transmission terminal and the secondary power transmission terminal, and has a closed state of electrically interconnecting the primary power transmission terminal and the secondary power transmission terminal and an open state of electrically separating the primary power transmission terminal and the secondary power transmission terminal from each other. The breaker controller is configured to set the connector-side breaker in the closed state during a normal state and to set the connector-side breaker in the open state during an abnormal state in which abnormality occurs in the electric vehicle.

In the electric vehicular connector of the second aspect in accordance with the present invention realized in combination with the first aspect, the breaker controller is configured to receive a vehicle abnormality signal from the electric vehicle by way of a signal transmission path passing through the inlet, and to set the connector-side breaker in the open state in response to reception of the vehicle abnormality signal.

In the electric vehicular connector of the third aspect in accordance with the present invention realized in combination with the second aspect, the plug further includes an abnormality detection terminal to be electrically connected to an abnormality notification terminal of the inlet. The signal transmission path is constituted by the abnormality notification terminal and the abnormality detection terminal.

In the electric vehicular connector of the fourth aspect in accordance with the present invention realized in combination with the second or third aspect, the vehicle abnormality signal is a signal of a high level or a low level. The breaker controller includes a switch for controlling the connector-side breaker. The connector-side breaker is configured to be in the open state while the switch is in a first state which is one of an on state and an off state and to be in the closed state while the switch is in a second state which is another of the on state and the off state. The breaker controller is configured to set the switch in the first state in response to reception of the vehicle abnormality signal.

In the electric vehicular connector of the fifth aspect in accordance with the present invention realized in combination with the second or third aspect, the electric vehicular connector further includes an abnormality detector configured to output a connector abnormality signal to the breaker controller in response to detection of abnormality of the electric vehicular connector. The breaker controller is configured to set the connector-side breaker in the open state in response to reception of the connector abnormality signal.

In the electric vehicular connector of the sixth aspect in accordance with the present invention realized in combination with the fifth aspect, each of the vehicle abnormality signal and the connector abnormality signal is a signal of a high level or a low level. The breaker controller includes: a switch for controlling the connector-side breaker; and a logic gate for controlling the switch. The connector-side breaker is configured to be in the open state while the switch is in a first state which is one of an on state and an off state and to be in the closed state while the switch is in a second state which is another of the on state and the off state. The logic gate includes a first input terminal to receive the vehicle abnormality signal, and a second input terminal to receive the connector abnormality signal. The logic gate is configured to set the switch in the first state in response to reception of any one of the vehicle abnormality signal and the connector abnormality signal.

The vehicular power supply device of the seventh aspect in accordance with the present invention includes: the electric vehicular connector of the first aspect; a power converter including a first power terminal; and an electric cable including one or more power supply lines electrically interconnecting the first power terminal of the power converter and the primary power transmission terminal of the electric vehicular connecter.

In the vehicular power supply device of the eighth aspect in accordance with the present invention realized in combination with the seventh aspect, the power converter includes: an abnormality detection terminal; a power conversion circuit; and a controller configured to control the power conversion circuit. The power conversion circuit is configured to perform an operation of converting power from an external circuit into power suitable for the electric vehicle and outputting this power to the first power terminal and an operation of converting power received by the first power terminal into power suitable for the external circuit and outputting this power to the external circuit. The connection terminal block includes an abnormality notification terminal. The electric cable includes a signal line electrically interconnecting the abnormality notification terminal and the abnormality detection terminal. The electric vehicular connector further includes an abnormality detector configured to output a connector abnormality signal to the abnormality notification terminal in response to detection of abnormality of the electric vehicular connector. The controller is configured to stop the power conversion circuit in response to reception of the connector abnormality signal.

In the vehicular power supply device of the ninth aspect in accordance with the present invention realized in combination with the seventh aspect, the power converter includes: an abnormality detection terminal; a power conversion circuit: and a controller configured to control the power conversion circuit. The power conversion circuit is configured to perform an operation of converting power from an external circuit into power suitable for the electric vehicle and outputting this power to the first power terminal and an operation of converting power received by the first power terminal into power suitable for the external circuit and outputting this power to the external circuit. The connection terminal block includes an abnormality notification terminal. The electric cable includes a signal line electrically interconnecting the abnormality notification terminal and the abnormality detection terminal. The plug further includes an abnormality detection terminal which is to be electrically connected to an abnormality notification terminal of the inlet to receive a vehicle abnormality signal from the electric vehicle. The electric vehicular connector further includes an abnormality detector configured to output a connector abnormality signal to the breaker controller in response to detection of abnormality of the electric vehicular connector. The breaker controller is configured to, in response to reception of the vehicle abnormality signal or the connector abnormality signal, set the connector-side breaker in the open state and output an abnormality signal to the abnormality notification terminal. The controller is configured to stop the power conversion circuit in response to reception of the abnormality signal.

In the vehicular power supply device of the tenth aspect in accordance with the present invention realized in combination with the seventh aspect, the power converter is configured to communicate with the electric vehicle by way of a communication path passing through the electric cable, the electric vehicular connector, and the inlet. The power converter is configured to send a breaking signal by way of a signal transmission path passing through the electric cable in response to reception of a vehicle abnormality notice from the electric vehicle through the communication path. The breaker controller is configured to set the connector-side breaker in the open state in response to reception of the breaking signal.

In the vehicular power supply device of the eleventh aspect in accordance with the present invention realized in combination with the tenth aspect, the power converter includes a power conversion circuit and a controller configured to control the power conversion circuit. The power conversion circuit is configured to perform an operation of converting power from an external circuit into power suitable for the electric vehicle and outputting this power to the first power terminal and an operation of converting power received by the first power terminal into power suitable for the external circuit and outputting this power to the external circuit. The controller is configured to stop the power conversion circuit in response to reception of the vehicle abnormality notice.

In the vehicular power supply device of the twelfth aspect in accordance with the present invention realized in combination with the tenth or eleventh aspect, the power converter further includes a first communication terminal and an abnormality notification terminal. The connection terminal block further includes a primary communication terminal and an abnormality detection terminal. The plug further includes a secondary communication terminal to be electrically connected to a second communication terminal of the inlet. The electric vehicular connector further includes a first communication path interconnecting the primary communication terminal and the secondary communication terminal. The electric cable further includes a second communication path interconnecting the first communication terminal and the primary communication terminal, and a signal line electrically interconnecting the abnormality notification terminal and the abnormality detection terminal. The communication path is constituted by the first communication terminal, the second communication path, the primary communication terminal, the first communication path, the secondary communication terminal, and the second communication terminal. The signal transmission path is constituted by the abnormality notification terminal, the signal line, and the abnormality detection terminal.

In the vehicular power supply device of the thirteenth aspect in accordance with the present invention realized in combination with the seventh aspect, the power converter is configured to communicate with the electric vehicle by way of a communication path passing through the electric cable, the electric vehicular connector, and the inlet. The electric vehicular connector is configured to send a connector abnormality signal to the electric vehicle by way of a signal transmission path passing through the inlet in response to detection of abnormality of the electric vehicular connector. The power converter is configured to receive a connector abnormality notice which is to be sent, by way of the communication path, from the electric vehicle in response to reception of the connector abnormality signal.

In the vehicular power supply device of the fourteenth aspect in accordance with the present invention realized in combination with the thirteenth aspect, the power converter includes a power conversion circuit and a controller configured to control the power conversion circuit. The power conversion circuit is configured to perform an operation of converting power from an external circuit into power suitable for the electric vehicle and outputting this power to the first power terminal and an operation of converting power received by the first power terminal into power suitable for the external circuit and outputting this power to the external circuit. The controller is configured to stop the power conversion circuit in response to reception of the connector abnormality notice.

In the vehicular power supply device of the fifteenth aspect in accordance with the present invention realized in combination with the thirteenth or fourteenth aspect, the power converter further includes a first communication terminal. The connection terminal block further includes a primary communication terminal. The plug further includes a secondary communication terminal to be electrically connected to a second communication terminal of the inlet and an abnormality notification terminal to be electrically connected to an abnormality detection terminal of the inlet. The electric vehicular connector further includes a first communication path interconnecting the primary communication terminal and the secondary communication terminal. The electric cable further includes a second communication path interconnecting the first communication terminal and the primary communication terminal. The communication path is constituted by the first communication terminal, the second communication path, the primary communication terminal, the first communication path, the secondary communication terminal, and the second communication terminal. The signal transmission path is constituted by the abnormality notification terminal and the abnormality detection terminal.

DESCRIPTION OF EMBODIMENTS

Embodiment 1

Figure 2:
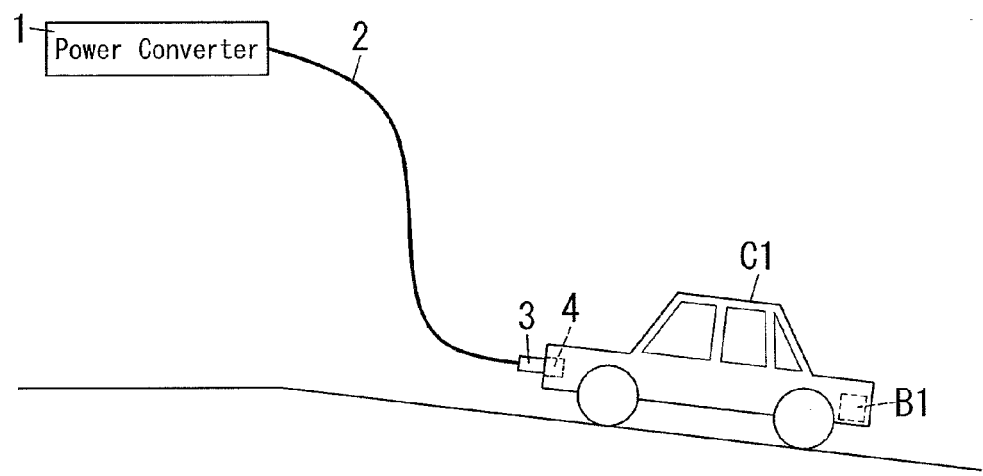
FIG. 2 is a schematic diagram illustrating configuration of the above vehicular power supply device.

FIG. 2 shows a schematic configuration of a vehicular power supply device of the present embodiment. The vehicular power supply device supplies charging power to the storage battery B1 mounted on an electric vehicle C1 such as an electric drive vehicle (EV) and a plug-in hybrid electric vehicle (PHEV), thereby charging the storage battery B1. Further, the vehicular power supply device converts discharge power of the storage battery B1 and supplies resultant power to a load which is not shown. In summary, the vehicular power supply device is a charge-discharge device with bidirectional power conversion function.

Figure 1:
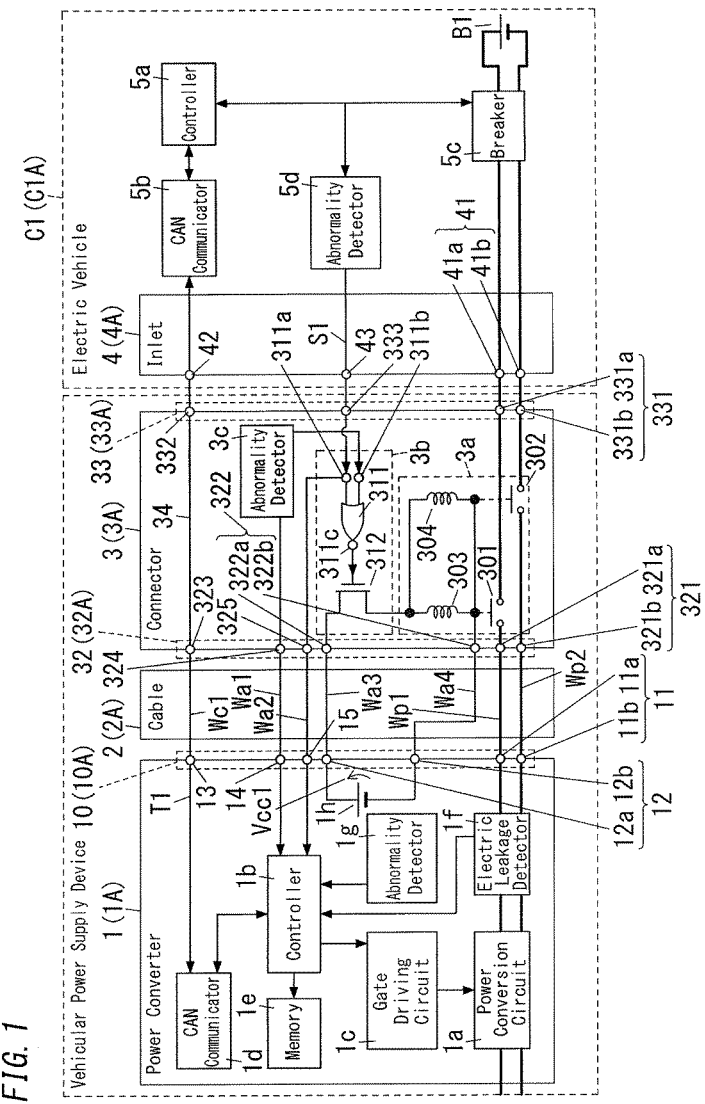
FIG. 1 is a block diagram illustrating configuration of the vehicular power supply device of Embodiment 1.

As shown in FIG. 1, the vehicular power supply device includes an electric vehicular power converter (hereinafter, referred to as "power converter") 1 (1A), an electric cable 2 (2A), and an electric vehicular connector (hereinafter, referred to as "connector") 3 (3A). Note that, the vehicular power supply device of the present embodiment and the electric vehicle C1 (C1A) constitute a charge-discharge system.

The electric cable 2A has a first end connected to the power converter 1A, and a second end connected to the connector 3A.

As shown in FIG. 1, the power converter 1A includes a power conversion circuit 1a, a controller 1b, a gate driving circuit 1c, a CAN communicator 1d, a memory 1e, an electric leakage detector 1f, an abnormality detector 1g, and a control power supply 1h.

The power converter 1A includes a terminal block (cable connection terminal block) 10 (10A) to be connected to the electric cable 2A. The cable connection terminal block 10A includes a power terminal (first power terminal) 11, a drive terminal (first drive terminal) 12, a communication terminal (first communication terminal) 13, an abnormality detection terminal (first abnormality detection terminal) 14, and an abnormality detection terminal (second abnormality detection terminal) 15. The first power terminal 11 includes a positive power terminal 11a and a negative power terminal 11b. The first drive terminal 12 includes a positive drive terminal 12a and a negative drive terminal 12b.

The electric cable 2A includes a pair of power supply lines Wp1 and Wp2 for sending charge power and discharge power of the storage battery B1. Further, the electric cable 2A includes four analog lines Wa1 to Wa4 and a CAN communication path (second communication path) Wc1.

The power conversion circuit 1a is a bidirectional converter circuit including one or more switching devices, for example. The power conversion circuit 1a generates DC power by converting commercial power (AC power), and supplies this DC power as charge power to the electric vehicle C1 by way of the electric cable 2 (the power supply lines Wp1 and Wp2) and the connector 3. Further, the power conversion circuit 1a receives discharge power supplied from the electric vehicle C1 by way of the electric cable 2 (the power supply lines Wp1 and Wp2) and the connector 3, and converts this discharge power into power with a predetermined voltage (AC or DC voltage) and supplies it to a load not shown.

As described above, the power conversion circuit 1a is configured to perform an operation (charging operation) of converting power (e.g., AC power) from an external circuit (e.g., a commercial power source system) into power (e.g., DC power) suitable for the electric vehicle C1 and outputting this power to the first power terminal 11. Further, the power conversion circuit 1a is configured to perform an operation (discharging operation) of converting power (e.g., DC power) received by the first power terminal 11 into power (e.g., AC power) suitable for the external circuit (e.g., a commercial power source system) and outputting this power to the external circuit. Note that, the power conversion circuit 1a may be configured to perform only one of the charging operation and the discharging operation.

The gate driving circuit 1c is a drive circuit for turning on and off the one or more switching devices of the power conversion circuit 1a. The controller 1b turns on and off the one or more switching devices of the power conversion circuit 1a by use of the gate driving circuit 1c, thereby controlling operation of the power conversion circuit 1a. Note that, the memory 1e stores information including programs to be executed by the controller 1b and data used by the programs.

The CAN communicator 1d establishes CAN (Controller Area Network) communication with the electric vehicle C1 by way of the CAN communication path Wc1 of the electric cable 2A. Note that, the CAN communication path Wc1 is constituted by a pair of signal lines. The CAN communicator 1d is to be connected to the CAN communication path Wc1 of the electric cable 2 via the first communication terminal 13.

The electric leakage detector 1f has a function of detecting electric leakage of a power supply path between the power converter 1 and the connector 3, and is configured to provide a notice of occurrence of electric leakage to the controller 1b in response to detection of electric leakage.

The abnormality detector 1g detects, based on signals from various sensors (not shown) included in the power converter 1, abnormality including abnormality in temperature of the power converter 1, overvoltage and overcurrent of input and output of the power conversion circuit 1a, and the like. When detecting the abnormality, the abnormality detector 1g sends a notice of occurrence of abnormality to the controller 1b. Note that, in the following explanation, the electric leakage detected by the electric leakage detector 1f is also treated as the abnormality.

The control power supply 1h generates control voltage Vcc1. The control power supply 1h includes a positive electrode and a negative electrode which are connected to the positive drive terminal 12a and the negative drive terminal 12b respectively. The positive drive terminal 12a and the negative drive terminal 12b are connected to the analog lines Wa3 and Wa4, respectively. Therefore, the control voltage Vcc1 is applied between the analog lines Wa3 and Wa4, thereby supplied to the connector 3. Note that, the control voltage Vcc1 may be used as control power for the power converter 1. Or, the control power supply 1h may generate the control voltage Vcc1 from power obtained from a power circuit.

When the abnormality detector 1g detects the abnormality or when the electric leakage detector 1f detects electric leakage, the controller 1b prohibits the power conversion operation performed by the power conversion circuit 1a. For example, during charging or discharging, the controller 1b stops the charge operation or discharge operation of the power conversion circuit 1a. In summary, the controller 1b stops the power conversion circuit 1a in response to occurrence of the abnormality in the power converter 1.

Further, before start of charging or discharging, the controller 1b does not allow the power conversion circuit 1a to start the charge operation or the discharge operation.

When the abnormality detector 1g detects the abnormality or when the electric leakage detector 1f detects electric leakage, the controller 1b sends a converter abnormality notice from the CAN communicator 1d to the electric vehicle C1.

The controller 1b is connected to the analog lines Wa1 and Wa2. The controller 1b prohibits the power conversion operation performed by the power conversion circuit 1a, in response to reception of at least one of a connector abnormality signal and a vehicle abnormality signal which are inputted through the analog lines Wa1 and Wa2 respectively. The connector abnormality signal and the vehicle abnormality signal are described later. In summary, the controller 1b stops the power conversion circuit 1a in response to reception of the connector abnormality signal or the vehicle abnormality signal.

Optionally, the power converter 1 may include one or more breakers (converter side breakers) (not shown) in an output path for charge power and an input path for discharge power of the power conversion circuit 1a. In this case, when prohibiting the power conversion operation performed by the power conversion circuit 1a, the power converter 1 turns off one or more converter side breakers to break a power supply path inside the power converter 1.

The second end of the electric cable 2 is connected to the connector 3. The connector 3 is to be removably connected to an inlet 4 provided to an external surface of a body of the electric vehicle C1.

The connector 3A includes: a connection terminal block 32 (32A) to be electrically connected to the power converter 1A; and a plug 33 (33A) for the inlet 4 (4A) of the electric vehicle C1 (C1A).

The connection terminal block 32A includes a primary power transmission terminal 321, a drive terminal (second drive terminal) 322, a primary communication terminal 323, an abnormality notification terminal (first abnormality notification terminal) 324, and an abnormality notification terminal (second abnormality notification terminal) 325. The primary power transmission terminal 321 includes a positive power transmission terminal 321a and a negative power transmission terminal 321b. The second drive terminal 322 includes a positive drive terminal 322a and a negative drive terminal 322b.

The plug 33A is to be removably connected to the inlet 4A. The plug 33A is provided to a surface (front surface) of a housing of the connector 3A, for example. The plug 33A has a shape mechanically connectable to the inlet 4A. When the plug 33A is connected to the inlet 4A, the connector 3A is electrically connected to the electric vehicle C1A.

The plug 33A includes a secondary power transmission terminal 331, a secondary communication terminal 332, and an abnormality detection terminal 333. The secondary power transmission terminal 331 includes a positive power transmission terminal 331a and a negative power transmission terminal 331b.

Further, the connector 3A includes a communication path (first communication path) 34 interconnecting the primary communication terminal 323 and the secondary communication terminal 332.

The positive power terminal 11a and the negative power terminal 11b of the first power terminal 11 of the power converter 1A are connected to the positive power transmission terminal 321a and the negative power transmission terminal 321b of the primary power transmission terminal 321 of the connector 3A through the power supply lines Wp1 and Wp2 of the electric cable 2A, respectively. In summary, the first power terminal 11 is electrically connected to the primary power transmission terminal 321 through the electric cable 2A.

The positive drive terminal 12a and the negative drive terminal 12b of the first drive terminal 12 of the power converter 1A are connected to the positive drive terminal 322a and the negative drive terminal 322b of the second drive terminal 322 of the connector 3A through the analog lines Wa3 and Wa4 of the electric cable 2A, respectively. In summary, the first drive terminal 12 is electrically connected to the second drive terminal 322 through the electric cable 2A.

The first communication terminal 13 of the power converter 1A is connected to the primary communication terminal 323 of the connector 3A through the communication path Wc1 of the electric cable 2A.

The first and second abnormality detection terminals 14 and 15 of the power converter 1A are connected to the first and second abnormality notification terminals 324 and 325 of the connector 3A through the analog lines (signal lines) Wa1 and Wa1 of the electric cable 2A, respectively.

The inlet 4A includes a power terminal (second power terminal) 41, a communication terminal (second communication terminal) 42, and an abnormality notification terminal 43. The second power terminal 41 includes a positive power terminal 41a and a negative power terminal 41b.

When the plug 33A of the connector 3A is connected to the inlet 4A, the positive power transmission terminal 331a and the negative power transmission terminal 331b of the secondary power transmission terminal 331 are connected to the positive power terminal 41a and the negative power terminal 41b of the second power terminal 41 of the inlet 4A, respectively. Additionally, the secondary communication terminal 332 is connected to the second communication terminal 42, and the abnormality detection terminal 333 is connected to the abnormality notification terminal 43.

In summary, as a result of connecting the connector 3 to the inlet 4, the power supply lines Wp1 and Wp2 of the electric cable 2 are electrically connected to power supply paths of the storage battery B1 inside the electric vehicle C1 through the inlet 4.

Additionally, as a result of connecting the connector 3 to the inlet 4, the CAN communication path Wc1 of the electric cable 2 is electrically connected to a CAN communicator 5b (described later) of the electric vehicle C1 through the inlet 4. Thus, a communication path T1 passing through the electric cable 2, the connector 3, and the inlet 4 is formed.

Further, as a result of connecting the connector 3 to the inlet 4, the analog line Wa1 of the electric cable 2 is electrically connected to an abnormality detector 5d (described later) of the electric vehicle C1 through the inlet 4.

The connector 3 includes a breaker (connector-side breaker) 3a, a breaker controller 3b, and an abnormality detector 3c.

The connector-side breaker 3a includes a contact device 301 for allowing and inhibiting a flow of current in a power supply path including the power supply line Wp1, and a contact device 302 for allowing and inhibiting a flow of current in a power supply path including the power supply line Wp2. Further, the connector-side breaker 3a includes: a solenoid 303 for turning on and off the contact device 301; and a solenoid 304 for turning on and off the contact device 302. Note that, the connector-side breaker 3a is normally-closed, and therefore the contact devices 301 and 302 are kept turned on (closed) while the solenoids 303 and 304 are not energized, and the contact devices 301 and 302 are kept turned off (opened) while the solenoids 303 and 304 are energized.

In summary, the connector-side breaker 3a is connected between the primary power transmission terminal 321 and the secondary power transmission terminal 331. The connector-side breaker 3a has a closed state of electrically interconnecting the primary power transmission terminal 321 and the secondary power transmission terminal 331, and an open state of electrically separating the primary power transmission terminal 321 and the secondary power transmission terminal 331 from each other.

For example, the connector-side breaker 3a includes: a relay (first relay) including the contact device 301 and the solenoid 303; and a relay (second relay) including the contact device 302 and the solenoid 304. The contact device 301 is connected between the positive power transmission terminals 321a and 331a, and the contact device 302 is connected between the negative power transmission terminals 321b and 331b.

The solenoids 303 and 304 are connected in parallel with each other. A parallel circuit of the solenoids 303 and 304 is connected between the positive drive terminal 322a and the negative drive terminal 322b.

Additionally, the connector 3 includes a latch mechanism (not shown) including one or more latches to be mechanically caught by the inlet 4.

Further, in order to avoid a situation where latching is released in supplying power and thus the connector 3 is detached from the inlet 4, the connector 3 includes a lock mechanism (not shown) for retaining the latching with electric force. This lock mechanism includes a solenoid valve (not shown). Locking and unlocking are switched around by operating the solenoid valve. The controller 1b operates the solenoid valve through a signal line (not shown) in the cable 2, thereby controlling locking and unlocking by the lock mechanism.

The abnormality detector 3c has a function of detecting abnormality of the connector 3 (e.g., abnormality in locking which means abnormality in the lock mechanism, and abnormality in temperature). The abnormality detector 3c outputs, to the breaker controller 3b, the connector abnormality signal which has a low level (L level) during a normal state and has a high level (H level) during detection of abnormality.

The breaker controller 3b sets the breaker 3a in the closed state during a normal state, and sets the breaker 3a in the open state during an abnormal state in which abnormality occurs in the electric vehicle C1A.

In the present embodiment, the breaker controller 3b is configured to receive the vehicle abnormality signal from the electric vehicle C1A by way of a signal transmission path S1 passing through the inlet 4A, and to set the breaker 3a in the open state in response to reception of the vehicle abnormality signal. The signal transmission path S1 is constituted by the abnormality notification terminal 43 and the abnormality detection terminal 333.

The breaker controller 3b includes a switch 312 for controlling the breaker 3a. The breaker 3a is configured to be in the open state while the switch 312 is in a first state (in the present embodiment, on state) which is one of an on state and an off state and to be in the closed state while the switch 312 is in a second state (in the present embodiment, off state) which is another of the on state and the off state. The breaker controller 3b is configured to set the switch 312 in the first state in response to reception of the vehicle abnormality signal.

Further, the breaker controller 3b sets the breaker 3a in the open state in response to reception of the connector abnormality signal. For this purpose, the breaker controller 3b includes a logic gate 311 for controlling the switch 312.

The logic gate 311 includes: a first input terminal 311a to receive the vehicle abnormality signal; and a second input terminal 311b to receive the connector abnormality signal. The logic gate 311 is configured to set the switch 312 in the first state in response to reception of any one of the vehicle abnormality signal and the connector abnormality signal.

The logic gate 311 is an NOR circuit 311, for example. The switch 312 is an FET such as a P-type MOSFET.

In summary, the breaker controller 3b is constituted by the NOR circuit 311 and the FET 312 which is a P-type MOSFET. One input terminal (the second input terminal 311b) of the NOR circuit 311 is connected to an output terminal of the abnormality detector 3c, and the other input terminal (the first input terminal 311a) of the NOR circuit 311 is connected to an output terminal of the abnormality detector 5d described later of the electric vehicle C1 by way of the signal transmission path S1 (the first signal transmission path) passing through the inlet 4.

The output terminal 311c of the NOR circuit 311 is connected to a gate of the FET 312 (i.e., a control terminal of the switch 312). Therefore, an output of the NOR circuit 311 is supplied to the gate of the FET 312, and thereby the FET 312 is turned on and off.

The FET 312 is connected in series with the parallel circuit of the solenoid 303 and the solenoid 304. In other words, the switch 312 and the parallel circuit of the solenoids 303 and 304 are connected in series between the positive drive terminals 322a and 322b.

Therefore, while the FET 312 is turned on, the control voltage Vcc1 which is supplied through the analog line Wa3 is applied across the solenoids 303 and 304.

A signal of an L level outputted from the NOR circuit 311 turns on the FET 312, and thereby the solenoids 303 and 304 are activated, and therefore the contact devices 301 and 302 are turned off. A signal of an H level outputted from the NOR circuit 311 turns off the FET 312, and thereby the solenoids 303 and 304 are not energized, and therefore the contact devices 301 and 302 are turned on.

Further, the abnormality detector 3c outputs the connector abnormality signal to the controller 1b of the power converter 1 through the analog line Wa1. In summary, the abnormality detector 3c is configured to output the connector abnormality signal to the abnormality notification terminal 324 in response to detection of abnormality of the electric vehicular connector 3A.

Further, the input terminal of the NOR circuit 311 which is connected to the signal transmission path S1 is also connected to the controller 1b of the power converter 1 through the analog line Wa1. In short, the abnormality detection terminal 333 is electrically connected to the abnormality notification terminal 325.

The electric vehicle C1 includes a controller 5a, the CAN communicator 5b, a vehicle-side breaker 5c, the abnormality detector 5d, and the storage battery B1.

The CAN communicator 5b is connected to the second communication terminal 42 of the inlet 4. The CAN communicator 5b is configured to establish CAN communication with the power converter 1 through the communication path T1.

The vehicle-side breaker 5c is connected between the second power terminal 41 of the inlet 4 and the storage battery B1. The vehicle-side breaker 5c has a closed state of electrically interconnecting the second power terminal 41 and the storage battery B1, and an open state of electrically separating the second power terminal 41 and the storage battery B1 from each other. In other words, the vehicle-side breaker 5c is interposed in power supply paths in the electric vehicle C1, and thus the vehicle-side breaker 5c allows and inhibits a flow of current through the power supply paths between the storage battery B1 and the inlet 4.

The abnormality detector 5d has a function of detecting abnormality in the electric vehicle C1 based on signals from various sensors (not shown) included in the electric vehicle C1. The abnormality detector 5d outputs the vehicle abnormality signal which has a low level (L level) during a normal state and has a high level (H level) during detection of abnormality. In the present embodiment, the abnormality detector 5d outputs the vehicle abnormality signal to the abnormality notification terminal 43 in response to detection of the abnormality of the electric vehicle C1. In short, the vehicle abnormality signal is sent to the input terminal of the NOR circuit 311 of the connector 3 by way of the signal transmission path S1 passing through the inlet 4.

The abnormality in the electric vehicle C1 may include overvoltage and overcurrent in circuits in the electric vehicle C1, insulation failure, abnormality in the storage battery B1, welding in the vehicle-side breaker 5c, and movements of the electric vehicle C1 in charging and discharging.

The controller 5a performs communication control of the CAN communicator 5b, on-off control of the vehicle-side breaker 5c, and the like. For example, the controller 5a sets the vehicle-side breaker 5c in the closed state during the normal state. When receiving the vehicle abnormality signal from the abnormality detector 5d, the controller 5a sets the vehicle-side breaker 5c in the open state and controls the CAN communicator 5b to send the vehicle abnormality signal to the power converter 1.

Hereinafter, operation of the vehicular power supply device is described.

First, in a state (normal state) where the electric leakage detector 1f does not detect electric leakage and the abnormality detector 1g, the abnormality detector 3c, and the abnormality detector 5d each do not detect the abnormality, the controller 1b of the power converter 1 allows the power conversion operation (the charge operation and the discharge operation) of the power conversion circuit 1a.

Further, in the normal state, each of the abnormality detectors 3c and 5d outputs a signal of an L level, and therefore the NOR circuit 311 of the connector 3 outputs a signal of an H level. As a result, the FET 312 is turned off, and the solenoids 303 and 304 are not energized, and consequently the contact devices 301 and 302 are turned on.

Further, in the normal state, the controller 5a of the electric vehicle C1 turns on the vehicle-side breaker 5c.

In the normal state, when a user performs a charge start operation (or discharge start operation) on the power converter 1, the controller 1b allows the power conversion circuit 1a to start the power conversion operation. In this regard, the power supply paths passing through the connector-side breaker 3a and the vehicle-side breaker 5c which are in on state are formed between the power conversion circuit 1a and the storage battery B1, and therefore the charge power for (or the discharge power from) the storage battery B1 is transferred.

Next, when the abnormality detector 1g of the power converter 1 detects the abnormality, the controller 1b prohibits the power conversion operation of the power conversion circuit 1a. In more detail, in charging or discharging, the charge operation or discharge operation performed by the power conversion circuit 1a is stopped. When charging or discharging is not performed, the power conversion circuit 1a is not allowed to start the charge operation or discharge operation.

When the abnormality detector 1g detects the abnormality, the controller 1b sends the converter abnormality notice from the CAN communicator 1d to the electric vehicle C1 through the communication path T1. When the CAN communicator 5b receives the converter abnormality notice, the controller 5a of the electric vehicle C1 turns off the vehicle-side breaker 5c and thereby breaks the power supply paths in the electric vehicle C1. Accordingly, as a result of occurrence of the abnormality of the power converter 1, the operation of the power conversion circuit 1*a* is stopped, and the vehicle-side breaker 5*c* breaks the power supply paths associated therewith. Thus, it is possible to ensure safety.

Further, when the CAN communicator 5*b* receives the converter abnormality notice, the controller 5*a* may cause the abnormality detector 5*d* to provide a pseudo signal corresponding to the vehicle abnormality signal of an H level. In this case, the output of the NOR circuit 311 of the connector 3 has an L level, and then the FET 312 is turned on and the contact devices 301 and 302 are turned off. Consequently, the connector-side breaker 3*a* breaks the power supply paths in the connector 3. Therefore, as a result of occurrence of the abnormality of the power converter 1, the connector-side breaker 3*a* breaks the power supply paths associated therewith. Thus, it is possible to more ensure safety.

Note that, even when the electric leakage detector 1*f* detects electric leakage, operation similar to the operation performed when the abnormality detector 1*g* of the power converter 1 detects the abnormality is performed.

Next, when the abnormality detector 3*c* of the connector 3 detects the abnormality, the abnormality detector 3*c* outputs the connector abnormality signal of an H level. Accordingly, the output of the NOR circuit 311 has an L level, and then the FET 312 is turned on and the contact devices 301 and 302 are turned off. Consequently, the connector-side breaker 3*a* breaks the power supply paths in the connector 3.

Further, the connector abnormality signal is transmitted to the controller 1*b* of the power converter 1 through the analog line Wa1, and accordingly the controller 1*b* prohibits the power conversion operation of the power conversion circuit 1*a*. The controller 1*b* sends a notice of breaking from the CAN communicator 1*d* to the electric vehicle C1 through the communication path T1. When the CAN communicator 5*b* receives the notice of breaking, the controller 5*a* of the electric vehicle C1 turns off the vehicle-side breaker 5*c*, thereby breaking the power supply paths in the electric vehicle C1.

Accordingly, as a result of occurrence of the abnormality of the connector 3, the operation of the power conversion circuit 1*a* is stopped, the connector-side breaker 3*a* breaks the power supply paths associated therewith, and the vehicle-side breaker 5*c* breaks the power supply paths associated therewith. Thus, it is possible to ensure safety.

When the abnormality detector 5*d* of the electric vehicle C1 detects the abnormality, the controller 5*a* turns off the vehicle-side breaker 5*c*, thereby breaking the power supply paths in the electric vehicle C1. Further, the abnormality detector 5*d* generates the vehicle abnormality signal of an H level, and the vehicle abnormality signal is inputted into the NOR circuit 311 of the connector 3 by way of the signal transmission path S1 passing through the inlet 4. Therefore, the output of the NOR circuit 311 has an L level, and then the FET 312 is turned on and the contact devices 301 and 302 are turned off. Accordingly, the connector-side breaker 3*a* breaks the power supply paths in the connector 3.

Further, the vehicle abnormality signal of an H level is transmitted to the controller 1*b* of the power converter 1 through the analog line Wa1, and accordingly the controller 1*b* prohibits the power conversion operation of the power conversion circuit 1*a*.

The vehicular power supply device of the present embodiment includes: a power converter 1 configured to perform power supply to a storage battery B1 included in an electric vehicle C1 or sending power to and receiving power from the storage battery B1; an electric cable 2 having one end connected to the power converter 1; a connector 3 provided to another end of the electric cable 2 and to be removably connected to an inlet 4 of the electric vehicle C1; and a connector-side breaker 3*a* placed in the connector 3 and configured to allow and inhibit a flow of current in power supply paths formed between the power converter 1 and the electric vehicle C1 through the electric cable 2. The connector 3 includes a breaker controller 3*b* configured to turn off the connector-side breaker 3*a* when abnormality occurs in the electric vehicle C1.

Further, the breaker controller 3*b* is configured to receive the vehicle abnormality signal from the electric vehicle C1 by way of the first signal transmission path S1 passing through the inlet 4. The breaker controller 3*b* is configured to turn off the connector-side breaker 3*a* in response to reception of the vehicle abnormality signal.

Accordingly, as a result of occurrence of the abnormality in the electric vehicle C1, the operation of the power conversion circuit 1*a* is stopped, the connector-side breaker 3*a* breaks the power supply paths associated therewith, and the vehicle-side breaker 5*c* breaks the power supply paths associated therewith. Thus, it is possible to ensure safety. For example, even when the abnormality occurs and thus the vehicle-side breaker 5*c* of the electric vehicle C1 is welded, the power supply paths are broken by the connector-side breaker 3*a* of the connector 3 which is closer to the storage battery B1 than the power converter 1 is.

When a dedicated signal line is added to the electric cable 2 in order to give a notice of occurrence of the abnormality in the electric vehicle C1 to the connector 3, a diameter and a weight of the electric cable 2 tend to increase. This leads to decrease in flexibility of the electric cable 2, and thus the electric cable 2 becomes hard. Consequently, handling of the electric cable 2 becomes difficult, and handleability becomes poor.

However, in the present embodiment, the signal transmission path S1 passing through the inlet 4 is added, and hence there is no need to add a dedicated signal line to the electric cable 2 in order to give a notice of occurrence of the abnormality in the electric vehicle C1 to the connector 3.

Therefore, the diameter and the weight of the electric cable 2 are not increased, and handling of the electric cable 2 does not become difficult. Thus, it is possible to turn off the connector-side breaker 3*a* in response to occurrence of the abnormality in the electric vehicle C1, without adding a dedicated signal line to the electric cable 2.

Further, software processing according to programs is not performed in order to give a notice of occurrence of the abnormality in the electric vehicle C1 to the connector 3. Therefore, the connector-side breaker 3*a* breaks the power supply paths associated therewith rapidly.

As described above, the electric vehicular connector 3 (3A) of the present embodiment includes the following first feature.

In the first feature, an electric vehicular connector 3 includes a connection terminal block 10, a plug 33, a connector-side breaker 3*a*, and a breaker controller 3*b*. The connection terminal block 10 includes a primary power transmission terminal 321 to be electrically connected to a first power terminal 11 of a power converter 1. The plug 33 includes a secondary power transmission terminal 331 to be electrically connected to a second power terminal 41 of an inlet 4 of an electric vehicle C1. The connector-side breaker 3*a* is connected between the primary power transmission terminal 321 and the secondary power transmission terminal 331, and has a closed state of electrically interconnecting the primary power transmission terminal 321 and the secondary power transmission terminal 331 and an open state of electrically separating the primary power transmission terminal 321 and the secondary power transmission terminal 331 from each other. The breaker controller 3b is configured to set the connector-side breaker 3a in the closed state during a normal state and to set the connector-side breaker 3a in the open state during an abnormal state in which abnormality occurs in the electric vehicle C1.

As described above, in the present embodiment, the connector 3 includes the breaker controller 3b configured to break power supply paths by turning off the connector-side breaker 3a in response to occurrence of the abnormality in the electric vehicle C1. Therefore, it is possible to turn off the connector-side breaker 3a in response to the abnormality in the electric vehicle C1.

Additionally, the electric vehicular connector 3 (3A) of the present embodiment includes the following second to sixth features. Note that, the second to sixth features are optional.

In the second feature realized in combination with the first feature, the breaker controller 3b is configured to receive a vehicle abnormality signal from the electric vehicle C1 by way of a signal transmission path S1 passing through the inlet 4, and to set the connector-side breaker 3a in the open state in response to reception of the vehicle abnormality signal.

In the third feature realized in combination with the second feature, the plug 33 further includes an abnormality detection terminal 333 to be electrically connected to an abnormality notification terminal 43 of the inlet 4. The signal transmission path S1 is constituted by the abnormality notification terminal 43 and the abnormality detection terminal 333.

In the fourth feature realized in combination with the second or third feature, the vehicle abnormality signal is a signal of a high level or a low level. The breaker controller 3b includes a switch 312 for controlling the connector-side breaker 3a. The connector-side breaker 3a is configured to be in the open state while the switch 312 is in a first state which is one of an on state and an off state and to be in the closed state while the switch 312 is in a second state which is another of the on state and the off state. The breaker controller 3b is configured to set the switch 312 in the first state in response to reception of the vehicle abnormality signal.

In the fifth feature realized in combination with the second or third feature, the electric vehicular connector 3 further includes an abnormality detector 3c configured to output a connector abnormality signal to the breaker controller 3b in response to detection of abnormality of the electric vehicular connector. The breaker controller 3b is configured to set the connector-side breaker 3a in the open state in response to reception of the connector abnormality signal.

In the sixth feature realized in combination with the fifth feature, each of the vehicle abnormality signal and the connector abnormality signal is a signal of a high level or a low level. The breaker controller 3b includes: a switch 312 for controlling the connector-side breaker 3a; and a logic gate 311 for controlling the switch 312. The connector-side breaker 3a is configured to be in the open state while the switch 312 is in a first state which is one of an on state and an off state and to be in the closed state while the switch 312 is in a second state which is another of the on state and the off state. The logic gate 311 includes: a first input terminal 311a to receive the vehicle abnormality signal; and a second input terminal 311b to receive the connector abnormality signal. The logic gate 311 is configured to set the switch 312 in the first state in response to reception of any one of the vehicle abnormality signal and the connector abnormality signal.

Besides, the vehicular power supply device of the present embodiment includes the following seventh feature.

In the seventh feature, a vehicular power supply device includes: the electric vehicular connector 3 having the first feature; a power converter 1 including a first power terminal 11; and an electric cable 2 including one or more power supply lines Wp1 and Wp2 electrically interconnecting the first power terminal 11 of the power converter 1 and the primary power transmission terminal 321 of the electric vehicular connecter 3. Note that, the electric vehicular connector 3 (3A) may include one or more of the second to sixth features, if necessary.

Further, the vehicular power supply device of the present embodiment includes the following eighth feature. Note that, the eighth feature is optional.

In the eighth feature realized in combination with the seventh feature, the power converter 1 includes: an abnormality detection terminal 14; a power conversion circuit 1a; and a controller 1b configured to control the power conversion circuit 1a. The power conversion circuit 1a is configured to perform an operation of converting power from an external circuit into power suitable for the electric vehicle C1 and outputting this power to the first power terminal 11 and an operation of converting power received by the first power terminal 11 into power suitable for the external circuit and outputting this power to the external circuit. The connection terminal block 10A includes an abnormality notification terminal 324. The electric cable 2A includes a signal line Wa1 electrically interconnecting the abnormality notification terminal 324 and the abnormality detection terminal 14. The electric vehicular connector 3A further includes an abnormality detector 3c configured to output a connector abnormality signal to the abnormality notification terminal 324 in response to detection of abnormality of the electric vehicular connector 3A. The controller 1b is configured to stop the power conversion circuit 1a in response to reception of the connector abnormality signal.

Embodiment 2

Figure 3:
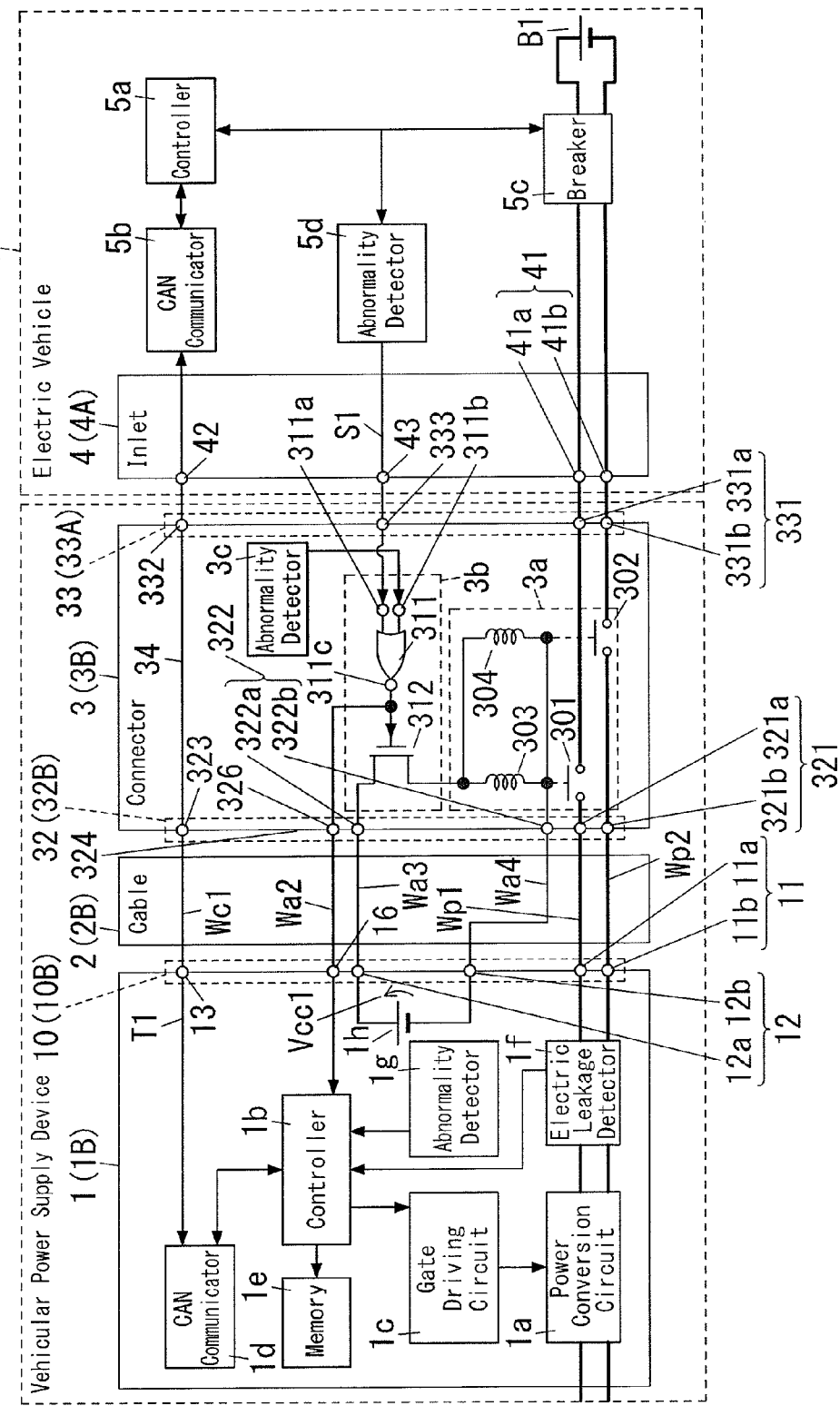
FIG. 3 is a block diagram illustrating configuration of the vehicular power supply device of Embodiment 2.

As shown in FIG. 3, the vehicular power supply device of the present embodiment is different from Embodiment 1 in that the analog line Wa1 is omitted and the analog line Wa1 of the electric cable 2 is connected to not the input terminal of the NOR circuit 311 of the connector 3 but the output terminal of the NOR circuit 311.

As shown in FIG. 3, the vehicular power supply device includes the power converter 1 (1B), the electric cable 2 (2B), and a connector 3 (3B). Note that, the vehicular power supply device of the present embodiment and the electric vehicle C1 (C1A) constitute a charge-discharge system.

The power converter 1B includes the power conversion circuit 1a, the controller 1b, the gate driving circuit 1c, the CAN communicator 1d, the memory 1e, the electric leakage detector 1f, and the abnormality detector 1g. Further, the power converter 1B includes a terminal block (cable connection terminal block) 10 (10B) to be connected to the electric cable 2B. The cable connection terminal block 10B includes the first power terminal 11, the first drive terminal 12, the first communication terminal 13, and an abnormality detection terminal (third abnormality detection terminal) 16. The third abnormality detection terminal 16 is connected to the controller 1b.

The connector 3B includes the connector-side breaker 3a, the breaker controller 3b, the abnormality detector 3c, and the first communication path 34. Further, the connector 3B includes: the connection terminal block 32 (32B) to be electrically connected to the power converter 1B; and the plug 33 (33A) for the inlet 4 (4A) of the electric vehicle C1 (C1A).

The connection terminal block 32B includes the primary power transmission terminal 321, the second drive terminal 322, the primary communication terminal 323, and an abnormality notification terminal (third abnormality notification terminal) 326.

The breaker controller 3b is configured to, in response to reception of the vehicle abnormality signal or the connector abnormality signal, set the connector-side breaker 3a in the open state and output an abnormality signal to the abnormality notification terminal 326.

As shown in FIG. 3, the output terminal 311c of the logic gate 311 is connected to the abnormality notification terminal 326. Therefore, when the connector abnormality signal or the vehicle abnormality signal is inputted into the logic gate 311, a signal (signal of an L level) outputted from the logic gate 311 is transmitted to the abnormality notification terminal 326 as the abnormality signal.

The electric cable 2B includes the pair of power supply lines Wp1 and Wp2, the three analog lines Wa2 to Wa4, and the CAN communication path (second communication path) Wc1. The third abnormality detection terminal 16 of the power converter 1B is connected to the third abnormality notification terminal 326 of the connector 3B through the analog line (signal line) Wa2.

The controller 1b is configured to stop the power conversion circuit 1a in response to reception of the abnormality signal through the third abnormality detection terminal 16.

Hereinafter, operation of the vehicular power supply device is described. When the abnormality of the connector 3 occurs and then the abnormality detector 3c generates the connector abnormality signal of an H level, or when the abnormality in the electric vehicle C1 occurs and then the abnormality detector 5d generates the vehicle abnormality signal of an H level, the output of the NOR circuit 311 has an L level.

Accordingly, the power converter 1 can determine, based on the output of the NOR circuit 311 inputted through the analog line Wa1, that the abnormality of the connector 3 or in the electric vehicle C1 has occurred. When the output of the NOR circuit 311 has an L level, the controller 1b prohibits the power conversion operation of the power conversion circuit 1a.

Therefore, it is possible to reduce the number of analog lines used in the electric cable 2, and thus the diameter and the weight of the electric cable 2 can be decreased and the flexibility of the electric cable 2 can be improved. As a result, handling of the electric cable 2 and the like becomes easier and this leads to improvement of handleability.

Note that, other components of the present embodiment are substantially the same as those of Embodiment 1, and thus are not described.

The vehicular power supply device described above includes the following ninth feature. Note that, the electric vehicular connector 3 (3B) may include one or more of the second to sixth features if necessary.

In the ninth feature, the power converter 1B includes an abnormality detection terminal 16, a power conversion circuit 1a, and a controller 1b configured to control the power conversion circuit 1a. The power conversion circuit 1a is configured to perform an operation of converting power from an external circuit into power suitable for the electric vehicle and outputting this power to the first power terminal 11 and an operation of converting power received by the first power terminal 11 into power suitable for the external circuit and outputting this power to the external circuit. The connection terminal block 32B includes an abnormality notification terminal 326. The electric cable 2B includes a signal line Wa2 electrically interconnecting the abnormality notification terminal 326 and the abnormality detection terminal 16. The plug 33A further includes an abnormality detection terminal 333 which is to be electrically connected to an abnormality notification terminal 43 of the inlet 4A to receive a vehicle abnormality signal from the electric vehicle C1A. The electric vehicular connector 3B further includes an abnormality detector 3c configured to output a connector abnormality signal to the breaker controller 3b in response to detection of abnormality of the electric vehicular connector 3B. The breaker controller 3b is configured to, in response to reception of the vehicle abnormality signal or the connector abnormality signal, set the connector-side breaker 3a in the open state and output an abnormality signal to the abnormality notification terminal 326. The controller 1b is configured to stop the power conversion circuit 1a in response to reception of the abnormality signal.

Embodiment 3

Figure 4:
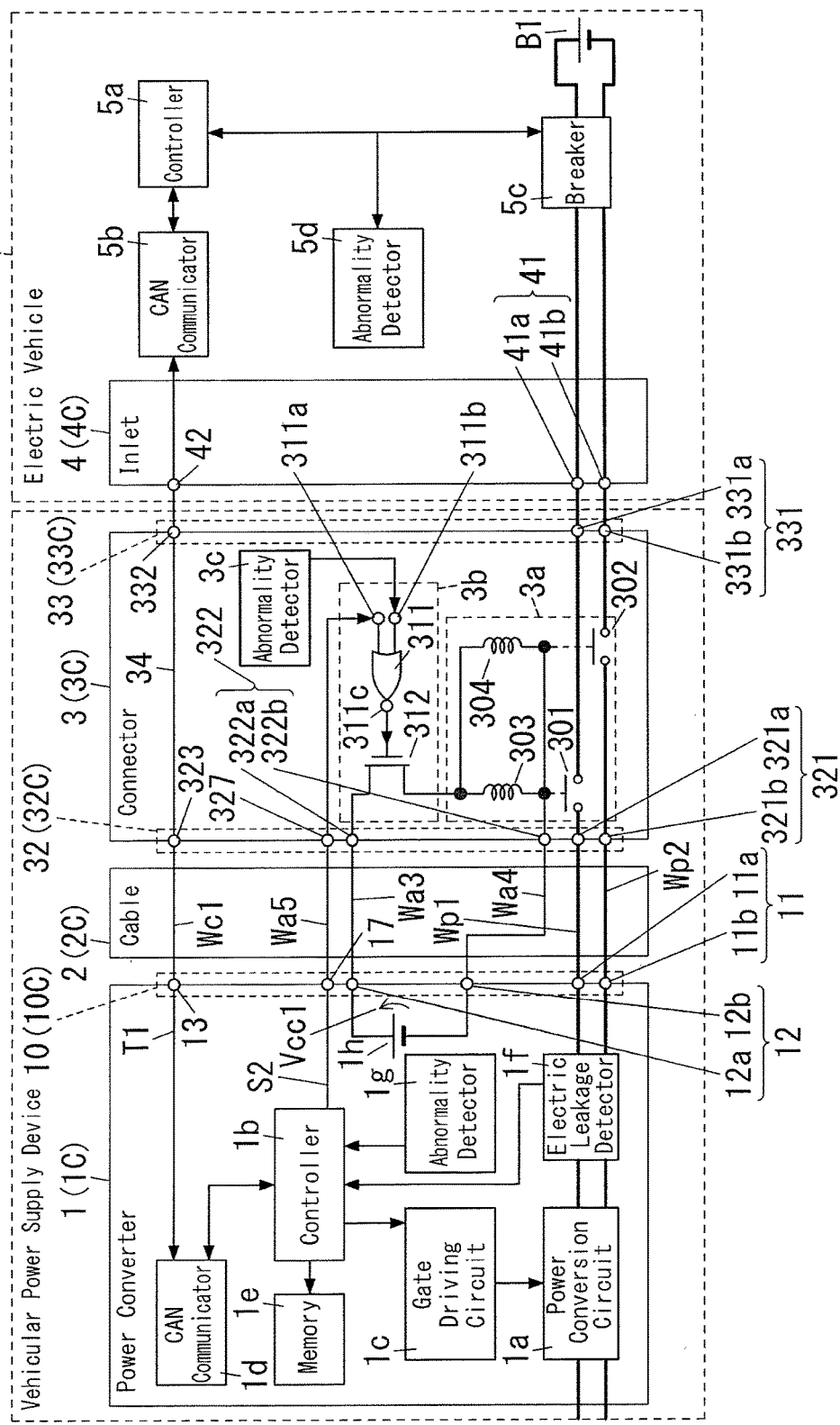
FIG. 4 is a block diagram illustrating configuration of the vehicular power supply device of Embodiment 3.

As shown in FIG. 4, the vehicular power supply device of the present embodiment is different from Embodiment 1 in that the signal transmission path S1 passing through the inlet 4 and the analog lines Wa1 and Wa2 are omitted and an analog line Wa5 is added to the electric cable 2. Note that, components common to the present embodiment and Embodiment 1 are designated by common reference signs to avoid redundant explanations.

As shown in FIG. 4, the vehicular power supply device includes the power converter 1 (1C), the electric cable 2 (2C), and a connector 3 (3C). Note that, the vehicular power supply device of the present embodiment and the electric vehicle C1 (C1C) constitute a charge-discharge system.

The power converter 1C includes the power conversion circuit 1a, the controller 1b, the gate driving circuit 1c, the CAN communicator 1d, the memory 1e, the electric leakage detector 1f, and the abnormality detector 1g. Further, the power converter 1C includes a terminal block (cable connection terminal block) 10 (10C) to be connected to the electric cable 2C. The cable connection terminal block 10C includes the first power terminal 11, the first drive terminal 12, the first communication terminal 13, and an abnormality notification terminal 17. The abnormality notification terminal 17 is connected to the controller 1b.

The connector 3C includes the connector-side breaker 3a, the breaker controller 3b, the abnormality detector 3c, and the first communication path 34. Further, the connector 3C includes: the connection terminal block 32 (32C) to be electrically connected to the power converter 1C; and the plug 33 (33C) for the inlet 4 (4C) of the electric vehicle C1 (C1C).

The connection terminal block 32C includes the primary power transmission terminal 321, the second drive terminal 322, the primary communication terminal 323, and an abnormality detection terminal 327. The abnormality detection terminal 327 is connected to the first input terminal 311a of the logic gate 311.

The plug 33C is to be removably connected to the inlet 4C. When the plug 33C is connected to the inlet 4C, the connector 3C is electrically connected to the electric vehicle C1C. The plug 33C includes the secondary power transmission terminal 331 and the secondary communication terminal 332.

The electric cable 2C includes the pair of power supply lines Wp1 and Wp2, the three analog lines Wa3 to Wa5, and the CAN communication path (second communication path) Wc1. The abnormality notification terminal 17 of the power converter 1C is connected to the abnormality detection terminal 327 of the connector 3C through the analog line (signal line) Wa5.

The electric vehicle C1C includes the storage battery B1, the controller 5a, the CAN communicator 5b, the breaker 5c, the abnormality detector 5d, and the inlet 4C. The inlet 4C includes the second power terminal 41 and the second communication terminal 42.

When the plug 33C of the connector 3C is connected to the inlet 4C, the secondary power transmission terminal 331 is connected to the second power terminal 41. Additionally, the secondary communication terminal 332 is connected to the second communication terminal 42.

In summary, the analog line Wa5 serves as a signal line for transmitting a breaking signal from the controller 1b of the power converter 1C to the input terminal of the NOR circuit 311 of the connector 3C. In other words, the analog line Wa5 is used to form a signal transmission path S2 (second signal transmission path) allowing transmission of signals from the power converter 1C (the controller 1b thereof) to the connector 3C (the breaker controller 3b thereof). Note that, one of the input terminals of the NOR circuit 311 is connected to the output terminal of the abnormality detector 3c and the other is connected to the output terminal of the controller 1b.

The controller 1b of the power converter 1C is configured to communicate with the controller 5a of the electric vehicle C1C by way of the communication path T1 passing through the electric cable 2C, the electric vehicular connector 3C, and the inlet 4C. The communication path T1 is constituted by the first communication terminal 13, the second communication path Wc1, the primary communication terminal 323, the first communication path 34, the secondary communication terminal 332, and the second communication terminal 42.

When receiving a vehicle abnormality notice from the electric vehicle C1C through the communication path T1, the controller 1b sends the breaking signal by way of the signal transmission path S2 passing through the electric cable 2C, and stops the power conversion circuit 1a. The signal transmission path S2 is constituted by the abnormality notification terminal 17, the signal line Wa5, and the abnormality detection terminal 327.

The breaking signal is a signal of a high level, for example. The breaking signal is inputted to the first input terminal 311a of the logic gate 311 through the signal transmission path S2. Therefore, the breaker controller 3b sets the connector-side breaker 3a in the open state in response to reception of the breaking signal.

Hereinafter, operation of the vehicular power supply device is described.

First, in a normal state where the electric leakage detector 1f does not detect electric leakage and the abnormality detector 1g, the abnormality detector 3c, and the abnormality detector 5d each do not detect the abnormality, the controller 1b of the power converter 1 allows the power conversion operation (the charge operation and the discharge operation) of the power conversion circuit 1a.

Further, in the normal state, the abnormality detector 3c outputs a signal of an L level and the controller 1b outputs a signal of an L level to the analog line Wa5, and therefore the NOR circuit 311 of the connector 3 outputs a signal of an H level. As a result, the FET 312 is turned off, and the solenoids 303 and 304 are not energized, and consequently the contact devices 301 and 302 are turned on.

Further, in the normal state, the controller 5a of the electric vehicle C1 turns on the vehicle-side breaker 5c.

In the normal state, when a user performs a charge start operation (or discharge start operation) on the power converter 1, the controller 1b allows the power conversion circuit 1a to start the power conversion operation. In this regard, the power supply paths passing through the connector-side breaker 3a and the vehicle-side breaker 5c which are in on state are formed between the power conversion circuit 1a and the storage battery B1, and therefore the charge power for (or the discharge power from) the storage battery B1 is transferred.

Next, when the abnormality detector 1g of the power converter 1 detects the abnormality, the controller 1b prohibits the power conversion operation of the power conversion circuit 1a. In more detail, in charging or discharging, the charge operation or discharge operation performed by the power conversion circuit 1a is stopped. When charging or discharging is not performed, the power conversion circuit 1a is not allowed to start the charge operation or discharge operation.

When the abnormality detector 1g detects the abnormality, the controller 1b sends the converter abnormality notice from the CAN communicator 1d to the electric vehicle C1 through the communication path T1.

When the CAN communicator 5b receives the converter abnormality notice, the controller 5a of the electric vehicle C1 turns off the vehicle-side breaker 5c and thereby breaks the power supply paths in the electric vehicle C1.

Accordingly, as a result of occurrence of the abnormality of the power converter 1, the operation of the power conversion circuit 1a is stopped, and the vehicle-side breaker 5c breaks the power supply paths associated therewith. Thus, it is possible to ensure safety.

Further, the controller 1b sends the breaking signal of an H level to the NOR circuit 311 of the connector 3 through the signal transmission path S2. Thus, the output of the NOR circuit 311 has an L level, and then the FET 312 is turned on and the contact devices 301 and 302 are turned off. Consequently, the connector-side breaker 3a breaks the power supply paths in the connector 3. Therefore, as a result of occurrence of the abnormality of the power converter 1, the connector-side breaker 3a breaks the power supply paths associated therewith. Thus, it is possible to more ensure safety.

Note that, even when the electric leakage detector 1f detects electric leakage, operation similar to the operation performed when the abnormality detector 1g of the power converter 1 detects the abnormality is performed.

Next, when the abnormality detector 3c of the connector 3 detects the abnormality, the abnormality detector 3c outputs the connector abnormality signal of an H level. Accordingly, the output of the NOR circuit 311 has an L level, and then the FET 312 is turned on and the contact devices 301 and 302 are turned off. Consequently, the connector-side breaker 3a breaks the power supply paths in the connector 3. Accordingly, as a result of occurrence of the abnormality of the connector 3, the connector-side breaker 3a breaks the power supply paths associated therewith.

When the abnormality detector 5*d* of the electric vehicle C1 detects the abnormality, the controller 5*a* turns off the vehicle-side breaker 5*c*, thereby breaking the power supply paths in the electric vehicle C1. Further, the controller 5*a* sends the vehicle abnormality notice from the CAN communicator 5*b* to the power converter 1 through the communication path T1.

When the CAN communicator 1*d* of the power converter 1 receives the vehicle abnormality notice through the communication path T1, the controller 1*b* prohibits the power conversion operation of the power conversion circuit 1*a*.

Further, the controller 1*b* sends the breaking signal of an H level to the NOR circuit 311 of the connector 3 through the signal transmission path S2. As a result, the output of the NOR circuit 311 has an L level, and then the FET 312 is turned on and the contact devices 301 and 302 are turned off. Thus, the connector-side breaker 3*a* breaks the power supply paths in the connector 3.

In the vehicular power supply device of the present embodiment, the power converter 1C is configured to communicate with the electric vehicle C1C by way of the communication path T1 passing through the electric cable 2C, the connector 3C, and the inlet 4C. The breaker controller 3*b* is configured to receive one or more signals from the power converter 1C by way of the second signal transmission path S2 passing through the electric cable 2C. The power converter 1C is configured to, when receiving the vehicle abnormality notice from the electric vehicle C1C by way of the communication path T1, send the breaking signal through the second signal transmission path S2. The breaker controller 3*b* is configured to turn off the connector-side breaker 3*a* in response to reception of the breaking signal.

Accordingly, as a result of occurrence of the abnormality in the electric vehicle C1, the operation of the power conversion circuit 1*a* is stopped, the connector-side breaker 3*a* breaks the power supply paths associated therewith, and the vehicle-side breaker 5*c* breaks the power supply paths associated therewith. Thus, it is possible to ensure safety.

Additionally, it is possible to reduce the number of analog lines used in the electric cable 2, and thus the diameter and the weight of the electric cable 2 can be decreased and the flexibility of the electric cable 2 can be improved. As a result, handling of the electric cable 2 and the like becomes easier and this leads to improvement of handleability.

The vehicular power supply device described above includes the following tenth feature.

In the tenth feature realized in combination with the seventh feature, the power converter 1C is configured to communicate with the electric vehicle C1C by way of a communication path T1 passing through the electric cable 2C, the electric vehicular connector 3C, and the inlet 4C. The power converter 1C is configured to send a breaking signal by way of a signal transmission path S2 passing through the electric cable 2C in response to reception of a vehicle abnormality notice from the electric vehicle C1C through the communication path T1. The breaker controller 3*b* is configured to set the connector-side breaker 3*a* in the open state in response to reception of the breaking signal.

Further, the vehicular power supply device of the present embodiment includes the following eleventh and twelfth features. Note that, the eleventh and twelfth features are optional.

In the eleventh feature realized in combination with the tenth feature, the power converter 1C includes a power conversion circuit 1*a* and a controller 1*b* configured to control the power conversion circuit 1*a*. The power conversion circuit 1*a* is configured to perform an operation of converting power from an external circuit into power suitable for the electric vehicle and outputting this power to the first power terminal 11 and an operation of converting power received by the first power terminal 11 into power suitable for the external circuit and outputting this power to the external circuit. The controller 1*b* is configured to stop the power conversion circuit 1*a* in response to reception of the vehicle abnormality notice.

In the twelfth feature realized in combination with the tenth or eleventh feature, the power converter 1C further includes a first communication terminal 13 and an abnormality notification terminal 17. The connection terminal block 32C further includes a primary communication terminal 323 and an abnormality detection terminal 327. The plug 33C further includes a secondary communication terminal 332 to be electrically connected to a second communication terminal 42 of the inlet 4C. The electric vehicular connector 3C further includes a first communication path 34 interconnecting the primary communication terminal 323 and the secondary communication terminal 332. The electric cable 2C further includes a second communication path Wc1 interconnecting the first communication terminal 13 and the primary communication terminal 323, and a signal line Wa5 electrically interconnecting the abnormality notification terminal 17 and the abnormality detection terminal 327. The communication path T1 is constituted by the first communication terminal 13, the second communication path Wc1, the primary communication terminal 323, the first communication path 34, the secondary communication terminal 332, and the second communication terminal 42. The signal transmission path S2 is constituted by the abnormality notification terminal 17, the signal line Wa5, and the abnormality detection terminal 327.

Embodiment 4

Figure 5:
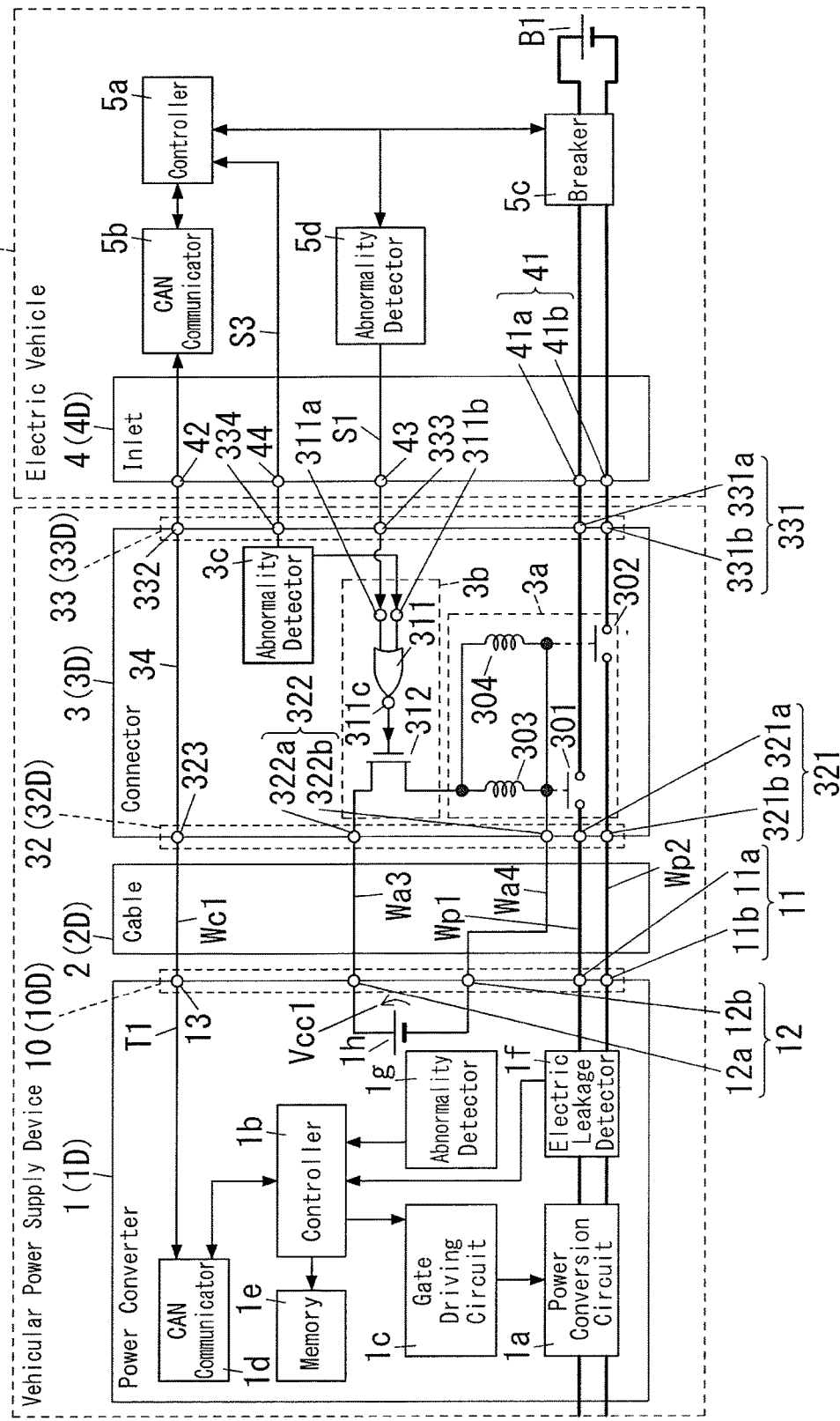
FIG. 5 is a block diagram illustrating configuration of the vehicular power supply device of Embodiment 4.

As shown in FIG. 5, the vehicular power supply device of the present embodiment is different from Embodiment 1 in that the analog lines Wa1 and Wa2 are omitted and the output terminal of the abnormality detector 3*c* is connected to the controller 5*a* of the electric vehicle C1 by way of a signal transmission path S3 (third signal transmission path) passing through the inlet 4. Note that, components common to the present embodiment and Embodiment 1 are designated by common reference signs to avoid redundant explanations.

As shown in FIG. 5, the vehicular power supply device includes the power converter 1 (1D), the electric cable 2 (2D), and a connector 3 (3D). Note that, the vehicular power supply device of the present embodiment and the electric vehicle C1 (C1D) constitute a charge-discharge system.

The power converter 1D includes the power conversion circuit 1*a*, the controller 1*b*, the gate driving circuit 1*c*, the CAN communicator 1*d*, the memory 1*e*, the electric leakage detector 1*f*, and the abnormality detector 1*g*. Further, the power converter 1D includes a terminal block (cable connection terminal block) 10 (10D) to be connected to the electric cable 2D. The cable connection terminal block 10D includes the first power terminal 11, the first drive terminal 12, and the first communication terminal 13.

The connector 3D includes the connector-side breaker 3*a*, the breaker controller 3*b*, the abnormality detector 3*c*, and the first communication path 34. Further, the connector 3D includes: the connection terminal block 32 (32D) to be electrically connected to the power converter 1D; and the plug 33 (33D) for the inlet 4 (4D) of the electric vehicle C1 (C1D).

The connection terminal block 32D includes the primary power transmission terminal 321, the second drive terminal 322, and the primary communication terminal 323.

The plug 33D is to be removably connected to the inlet 4D. When the plug 33D is connected to the inlet 4D, the connector 3D is electrically connected to the electric vehicle C1D. The plug 33D includes the secondary power transmission terminal 331, the secondary communication terminal 332, the abnormality detection terminal 333, and an abnormality notification terminal 334. The abnormality notification terminal 334 is connected to the abnormality detector 3c.

The electric cable 2D includes the pair of power supply lines Wp1 and Wp2, the two analog lines Wa3 and Wa4, and the CAN communication path (second communication path) Wc1.

The electric vehicle C1D includes the storage battery B1, the controller 5a, the CAN communicator 5b, the breaker 5c, the abnormality detector 5d, and the inlet 4D. The inlet 4D includes the second power terminal 41, the second communication terminal 42, the abnormality notification terminal 43, and an abnormality detection terminal 44. The abnormality detection terminal 44 is connected to the controller 5a.

When the plug 33D of the connector 3D is connected to the inlet 4D, the secondary power transmission terminal 331 is connected to the second power terminal 41. Additionally, the secondary communication terminal 332 is connected to the second communication terminal 42. Further, the abnormality detection terminal 333 and the abnormality notification terminal 334 of the plug 33D are connected to the abnormality notification terminal 43 and the abnormality detection terminal 44 of the inlet 4D, respectively.

In the present embodiment, the abnormality detector 3c is configured to, when detecting the abnormality of the electric vehicular connector 3D, send the connector abnormality signal to the electric vehicle C1D by way of the signal transmission path S3 passing through the inlet 4D and also send the connector abnormality signal to the breaker controller 3b. The signal transmission path S3 is constituted by the abnormality notification terminal 334 and the abnormality detection terminal 44.

The controller 1b of the power converter 1D is configured to communicate with the electric vehicle C1D by way of the communication path T1 passing through the electric cable 2D, the electric vehicular connector 3D, and the inlet 4D. The communication path T1 is constituted by the first communication terminal 13, the second communication path Wc1, the primary communication terminal 323, the first communication path 34, the secondary communication terminal 332, and the second communication terminal 42.

The controller 5a of the electric vehicle C1D is configured to send a connector abnormality notice to the controller 1b of the power converter 1D through the communication path T1 in response to reception of the connector abnormality signal.

The controller 1b of the power converter 1D is configured to stop the power conversion circuit 1a in response to reception of the connector abnormality notice.

Hereinafter, operation of the vehicular power supply device is described.

First, in a normal state where the electric leakage detector 1f does not detect electric leakage and the abnormality detector 1g, the abnormality detector 3c, and the abnormality detector 5d each do not detect the abnormality, the controller 1b of the power converter 1 allows the power conversion operation (the charge operation and the discharge operation) of the power conversion circuit 1a.

Further, in the normal state, each of the abnormality detectors 3c and 5d outputs a signal of an L level, and therefore the NOR circuit 311 of the connector 3 outputs a signal of an H level. As a result, the FET 312 is turned off, and the solenoids 303 and 304 are not energized, and consequently the contact devices 301 and 302 are turned on.

Further, in the normal state, the controller 5a of the electric vehicle C1 turns on the vehicle-side breaker 5c.

In the normal state, when a user performs a charge start operation (or discharge start operation) on the power converter 1, the controller 1b allows the power conversion circuit 1a to start the power conversion operation. In this regard, the power supply paths passing through the connector-side breaker 3a and the vehicle-side breaker 5c which are in on state are formed between the power conversion circuit 1a and the storage battery B1, and therefore the charge power for (or the discharge power from) the storage battery B1 is transferred.

Next, when the abnormality detector 1g of the power converter 1 detects the abnormality, the controller 1b prohibits the power conversion operation of the power conversion circuit 1a. In more detail, in charging or discharging, the charge operation or discharge operation performed by the power conversion circuit 1a is stopped. When charging or discharging is not performed, the power conversion circuit 1a is not allowed to start the charge operation or discharge operation.

When the abnormality detector 1g detects the abnormality, the controller 1b sends the converter abnormality notice from the CAN communicator 1d to the electric vehicle C1 through the communication path T1.

When the CAN communicator 5b receives the converter abnormality notice, the controller 5a of the electric vehicle C1 turns off the vehicle-side breaker 5c and thereby breaks the power supply paths in the electric vehicle C1.

Accordingly, as a result of occurrence of the abnormality of the power converter 1, the operation of the power conversion circuit 1a is stopped, and the vehicle-side breaker 5c breaks the power supply paths associated therewith. Thus, it is possible to ensure safety.

Further, when the CAN communicator 5b receives the converter abnormality notice, the controller 5a may cause the abnormality detector 5d to provide a pseudo signal corresponding to the vehicle abnormality signal of an H level. In this case, the output of the NOR circuit 311 of the connector 3 has an L level, and then the FET 312 is turned on and the contact devices 301 and 302 are turned off. Consequently, the connector-side breaker 3a breaks the power supply paths in the connector 3. Therefore, as a result of occurrence of the abnormality of the power converter 1, the connector-side breaker 3a breaks the power supply paths associated therewith. Thus, it is possible to more ensure safety.

Note that, even when the electric leakage detector 1f detects electric leakage, operation similar to the operation performed when the abnormality detector 1g of the power converter 1 detects the abnormality is performed.

Next, when the abnormality detector 3c of the connector 3 detects the abnormality, the abnormality detector 3c outputs the connector abnormality signal of an H level. Accordingly, the output of the NOR circuit 311 has an L level, and then the FET 312 is turned on and the contact devices 301 and 302 are turned off. Consequently, the connector-side breaker 3a breaks the power supply paths in the connector 3.

Further, the connector abnormality signal outputted by the abnormality detector 3c is inputted to the controller 5a of the electric vehicle C1 via the signal transmission path S3 passing through the inlet 4. The controller 5a turns off the vehicle-side breaker 5c, and breaks the power supply paths in the electric vehicle C1. Additionally, the controller 5a sends the connector abnormality notice from the CAN communicator 5b to the power converter 1 through the communication path T1.

When the CAN communicator 1d of the power converter 1 receives the converter abnormality notice through the communication path T1, the controller 1b prohibits the power conversion operation of the power conversion circuit 1a.

Accordingly, as a result of occurrence of the abnormality of the connector 3, the operation of the power conversion circuit 1a is stopped, the connector-side breaker 3a breaks the power supply paths associated therewith, and the vehicle-side breaker 5c breaks the power supply paths associated therewith. Thus, it is possible to ensure safety.

When the abnormality detector 5d of the electric vehicle C1 detects the abnormality, the controller 5a turns off the vehicle-side breaker 5c, thereby breaking the power supply paths in the electric vehicle C1.

Further, the abnormality detector 5d generates the vehicle abnormality signal of an H level, and the vehicle abnormality signal is inputted into the NOR circuit 311 of the connector 3 by way of the signal transmission path S1 passing through the inlet 4. Therefore, the output of the NOR circuit 311 has an L level, and then the FET 312 is turned on and the contact devices 301 and 302 are turned off. Accordingly, the connector-side breaker 3a breaks the power supply paths in the connector 3.

Further, the controller 5a sends the vehicle abnormality notice from the CAN communicator 5b to the power converter 1 through the communication path T1.

When the CAN communicator 1d of the power converter 1 receives the vehicle abnormality notice through the communication path T1, the controller 1b prohibits the power conversion operation of the power conversion circuit 1a.

In the vehicular power supply device of the present embodiment, the power converter 1D communicates with the electric vehicle C1D by way of the communication path T1 passing through the electric cable 2D, the connector 3D, and the inlet 4D. When the abnormality of the connector 3D occurs, the connector 3D sends the connector abnormality signal to the electric vehicle C1D by way of the third signal transmission path S3 passing through the inlet 4D. The power converter 1D receives the connector abnormality notice which is sent through the communication path T1 by the electric vehicle C1D in response to reception of the connector abnormality signal.

Accordingly, as a result of occurrence of the abnormality in the electric vehicle C1, the operation of the power conversion circuit 1a is stopped, the connector-side breaker 3a breaks the power supply paths associated therewith, and the vehicle-side breaker 5c breaks the power supply paths associated therewith. Thus, it is possible to ensure safety.

Moreover, in the present embodiment, the signal transmission path S3 passing through the inlet 4 is added, and hence there is no need to add a dedicated signal line to the electric cable 2 in order to give a notice of occurrence of the abnormality in the connector 3 to the power converter 1. Therefore, the diameter and the weight of the electric cable 2 are not increased, and handling of the electric cable 2 does not become difficult. Thus, it is possible to notify the power converter 1 of occurrence of the abnormality of the connector 3, without adding a dedicated signal line to the electric cable 2.

The vehicular power supply device of the present embodiment described above includes the following thirteenth feature. Note that, the electric vehicular connector 3 (3D) may include one or more of the second to sixth features if necessary.

In the thirteenth feature realized in combination with the seventh feature, the power converter 1D is configured to communicate with the electric vehicle C1D by way of a communication path T1 passing through the electric cable 2D, the electric vehicular connector 3D, and the inlet 4D. The electric vehicular connector 3D is configured to send a connector abnormality signal to the electric vehicle C1D by way of a signal transmission path S3 passing through the inlet 4D in response to detection of abnormality of the electric vehicular connector 3D. The power converter 1D is configured to receive a connector abnormality notice which is to be sent, by way of the communication path T1, from the electric vehicle C1D in response to reception of the connector abnormality signal.

In the fourteenth feature realized in combination with the thirteenth feature, the power converter 1D includes a power conversion circuit 1a, and a controller 1b configured to control the power conversion circuit 1a. The power conversion circuit 1a is configured to perform an operation of converting power from an external circuit into power suitable for the electric vehicle and outputting this power to the first power terminal 11 and an operation of converting power received by the first power terminal 11 into power suitable for the external circuit and outputting this power to the external circuit. The controller 1b is configured to stop the power conversion circuit 1a in response to reception of the connector abnormality signal.

In the fifteenth feature realized in combination with the thirteenth or fourteenth feature, the power converter 1D further includes a first communication terminal 13. The connection terminal block 32D further includes a primary communication terminal 323. The plug 33D further includes a secondary communication terminal 332 to be electrically connected to a second communication terminal 42 of the inlet 4D and an abnormality notification terminal 334 to be electrically connected to an abnormality detection terminal 44 of the inlet 4D. The electric vehicular connector 3D further includes a first communication path 34 interconnecting the primary communication terminal 323 and the secondary communication terminal 332. The electric cable 2D further includes a second communication path Wc1 interconnecting the first communication terminal 13 and the primary communication terminal 323. The communication path T1 is constituted by the first communication terminal 13, the second communication path Wc1, the primary communication terminal 323, the first communication path 34, the secondary communication terminal 332, and the second communication terminal 42. The signal transmission path S3 is constituted by the abnormality notification terminal 334 and the abnormality detection terminal 44.

Embodiment 5

Figure 6:
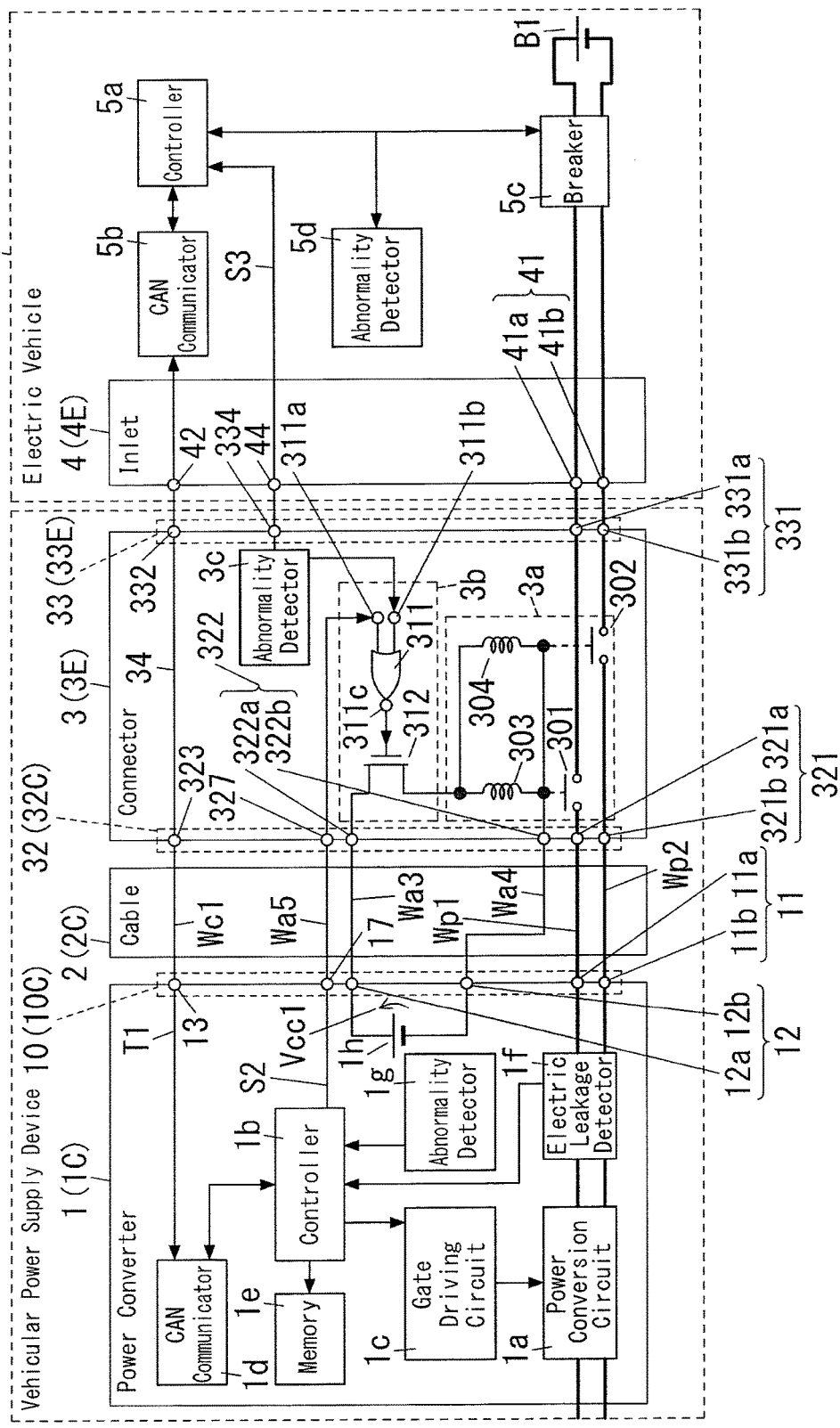
FIG. 6 is a block diagram illustrating configuration of the vehicular power supply device of Embodiment 5.
Figure 7:
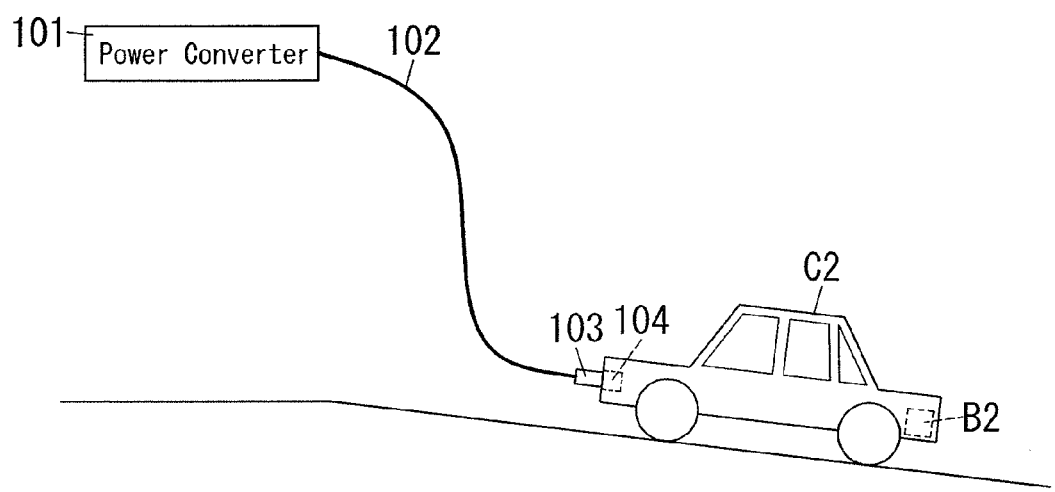
FIG. 7 is a schematic diagram illustrating configuration of the vehicular power supply device of conventional technique.
Figure 8:
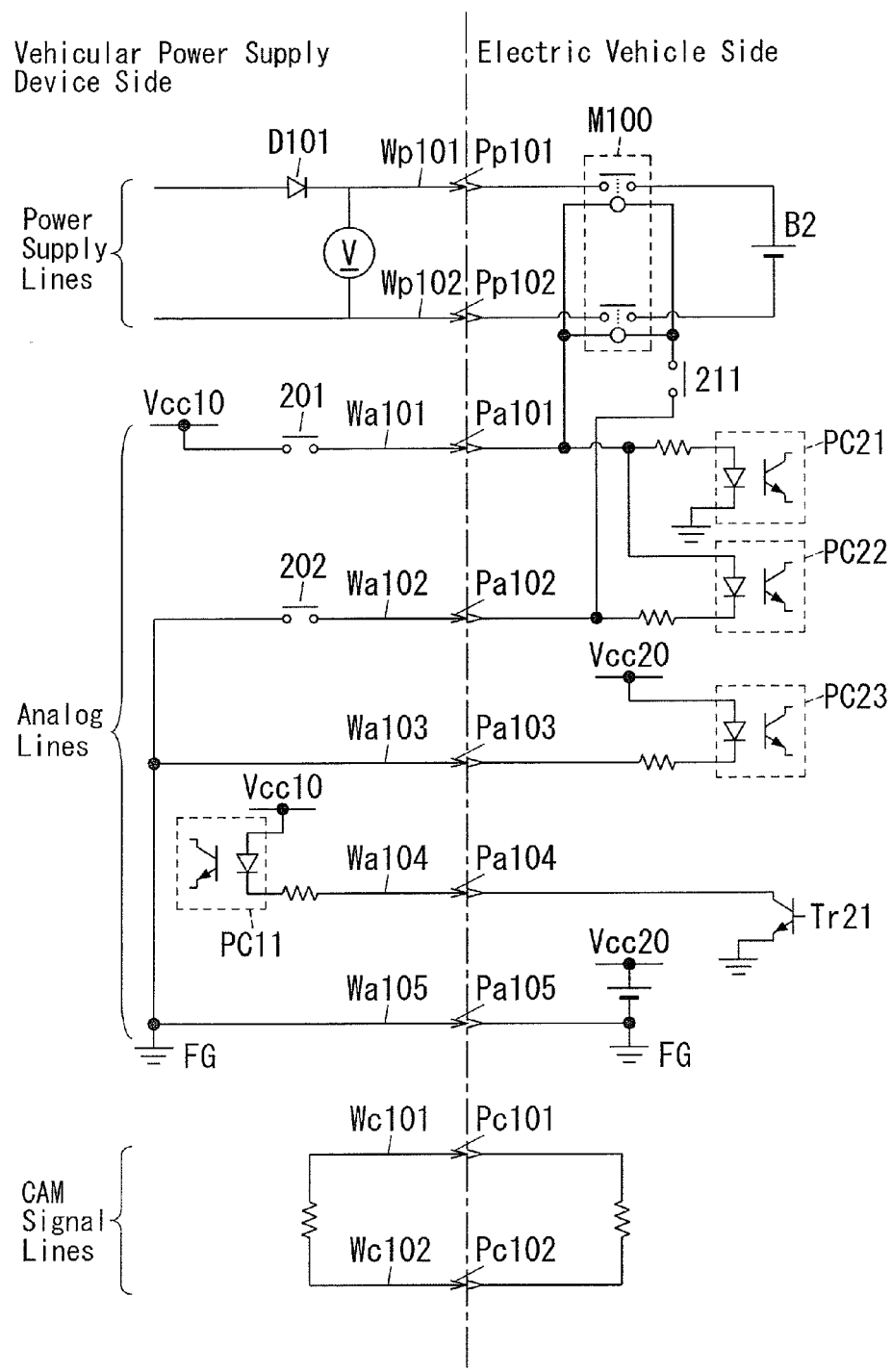
FIG. 8 is a circuit diagram illustrating an interface of the CHAdeMO standard.

The vehicular power supply device of the present embodiment is same in basic configuration as Embodiment 3 but, as shown in FIG. 6, like Embodiment 4, the output terminal of the abnormality detector 3c is connected to the controller 5a of the electric vehicle C1 by way of the signal transmission path S3 (third signal transmission path) passing through the inlet 4.

As shown in FIG. 6, the vehicular power supply device includes the power converter 1 (1C), the electric cable 2 (2C), and a connector 3 (3E). Note that, the vehicular power supply device of the present embodiment and the electric vehicle C1 (C1E) constitute a charge-discharge system.

The connector 3E includes the connector-side breaker 3a, the breaker controller 3b, the abnormality detector 3c, and the first communication path 34. Further, the connector 3E includes: the connection terminal block 32 (32C) to be electrically connected to the power converter 1C; and the plug 33 (33E) for the inlet 4 (4E) of the electric vehicle C1 (C1E).

The plug 33E is to be removably connected to the inlet 4E. When the plug 33E is connected to the inlet 4E, the connector 3E is electrically connected to the electric vehicle C1E. The plug 33E includes the secondary power transmission terminal 331, the secondary communication terminal 332, and the abnormality notification terminal 334.

The electric vehicle C1E includes the storage battery B1, the controller 5a, the CAN communicator 5b, the breaker 5c, the abnormality detector 5d, and the inlet 4E. The inlet 4E includes the second power terminal 41, the second communication terminal 42, and the abnormality detection terminal 44.

When the plug 33E of the connector 3E is connected to the inlet 4E, the secondary power transmission terminal 331 is connected to the second power terminal 41 of the inlet 4E. Additionally, the secondary communication terminal 332 is connected to the second communication terminal 42. Further, the abnormality notification terminal 334 of the plug 33E is connected to the abnormality detection terminal 44 of the inlet 4E.

Also in the present embodiment, the abnormality detector 3c is configured to, when detecting the abnormality of the electric vehicular connector 3E, send the connector abnormality signal to the electric vehicle C1E by way of the signal transmission path S3 passing through the inlet 4E and also send the connector abnormality signal to the breaker controller 3b. The signal transmission path S3 is constituted by the abnormality notification terminal 334 and the abnormality detection terminal 44.

The controller 5a of the electric vehicle C1E is configured to send the connector abnormality notice to the controller 1b of the power converter 1C through the communication path T1 in response to reception of the connector abnormality signal.

The controller 1b of the power converter 1C is configured to stop the power conversion circuit 1a in response to reception of the connector abnormality notice.

Also in the present embodiment, like Embodiment 4, the connector abnormality signal outputted by the abnormality detector 3c is inputted to the controller 5a of the electric vehicle C1 via the signal transmission path S3 passing through the inlet 4. Therefore, like the above, when the abnormality of the connector 3 occurs, the vehicle-side breaker 5c can be turned off so as to break the power supply paths in the electric vehicle C1, and the controller 1b can prohibit the power conversion operation of the power conversion circuit 1a.

The vehicular power supply device of the present embodiment described above includes the aforementioned tenth and thirteenth features. Note that, the vehicular power supply device of the present embodiment may include one or more of the aforementioned eleventh, twelfth, fourteenth, and fifteenth features if necessary.

Figure 9:
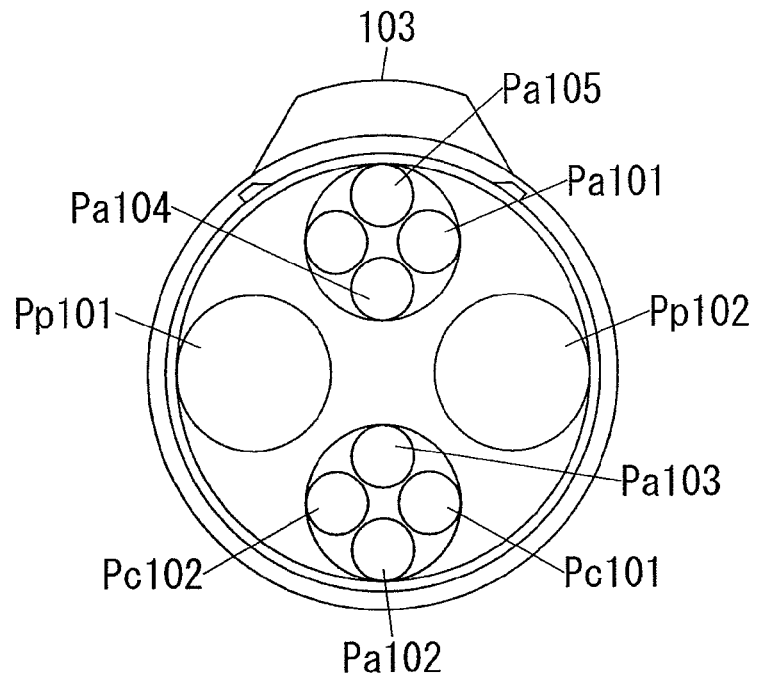
FIG. 9 is a plan illustrating arrangement of pins of a connector of the CHAdeMO standard.
Figure 10:
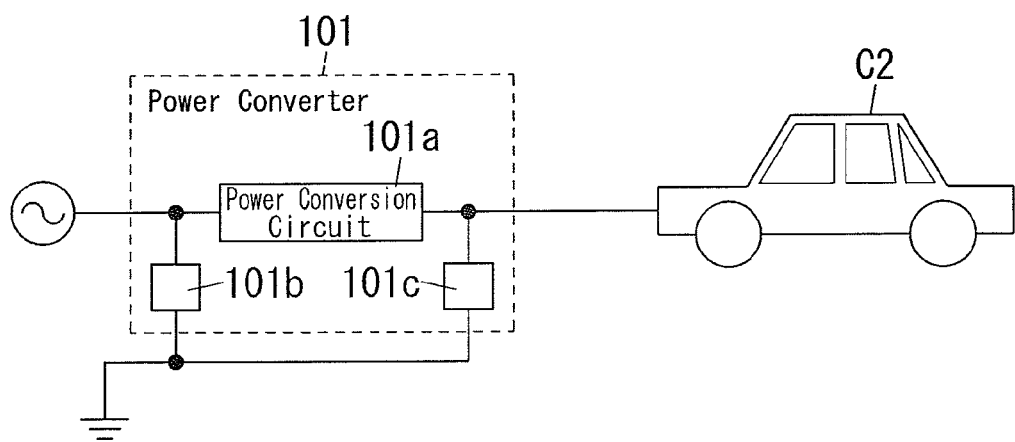
FIG. 10 is a schematic diagram illustrating configuration for ground fault detection.
Figure 11:
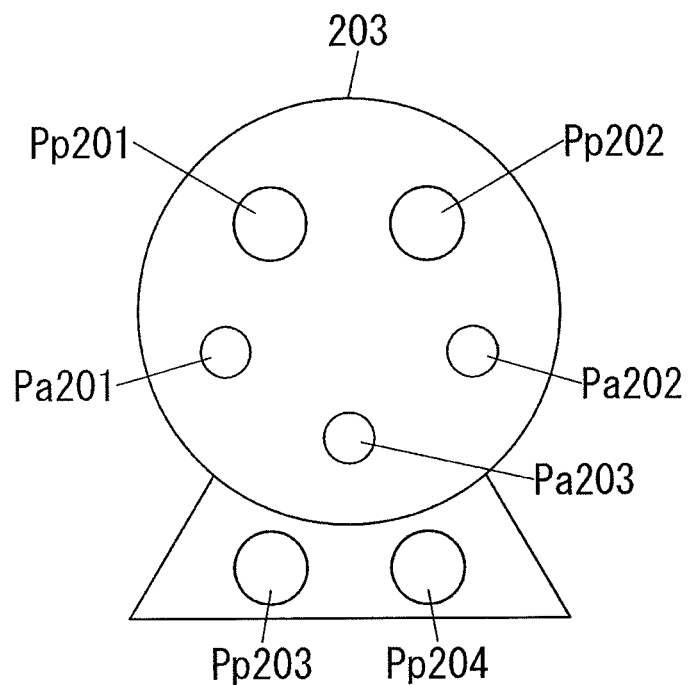
FIG. 11 is a plan illustrating arrangement of pins of a connector of the Combo standard.

Note that, in each of Embodiments 1 to 5, the power converter 1 and the electric vehicle C1 establish communication by way of the communication path T1. The communication by way of the communication path T1 corresponds to CAN communication by way of CAN signal lines Wc101 and Wc102 of an interface in conformity with the CHAdeMO standard shown in FIG. 9. Or, the communication by way of the communication path T1 corresponds to in-band communication by way of analog lines connected to pins Pa201 to Pa203 of an interface in conformity with the Combo standard shown in FIG. 11.

Note that, configurations defined by the CHAdeMO standard or the Combo standard may be applied to configuration of the electric cable 2, communication sequences between the power converter 1 and the electric vehicle C1, and the like of each Embodiment.

Note that, in the aforementioned Embodiments 1 to 5, the signals (the connector abnormality signal, the vehicle abnormality signal, and the breaking signal) to be inputted to the logic gate 311 are signals of an H level (high level), but may be signals of an L level (low level). In summary, the signals to be inputted to the logic gate 311 may be signals of a truth value (logic value) of "T" in design of the logic gate 311.

Note that, the relays (first and second relays) of the breaker 3a may be preferably normally-closed, but may be normally-opened. The switch 312 may be preferably a P-type MOSFET, but may be another switching device. The logic gate 311, the relays of the breaker 3a, and the switch 312 are selected so that the breaker 3a is in the open state when the output of the logic gate 311 shows a truth value of "T".

The invention claimed is:

1. A vehicular power supply device, comprising:
    an electric vehicular connector including a connection terminal block including a primary power transmission terminal;
    a power converter including a first power terminal; and
    an electric cable including one or more power supply lines electrically interconnecting the first power terminal of the power converter and the primary power transmission terminal of the electric vehicular connecter,
    the electric vehicular connector further including
        a plug including a secondary power transmission terminal to be electrically connected to a second power terminal of an inlet of an electric vehicle,
        a connector-side breaker which is connected between the primary power transmission terminal and the secondary power transmission terminal, and has a closed state of electrically interconnecting the primary power transmission terminal and the secondary power transmission terminal and an open state of electrically separating the primary power transmission terminal and the secondary power transmission terminal from each other, and
        a breaker controller configured to set the connector-side breaker in the closed state during a normal state and to set the connector-side breaker in the open state during an abnormal state in which abnormality occurs in the electric vehicle,
    the power converter being configured to communicate with the electric vehicle by way of a communication path passing through the electric cable, the electric vehicular connector, and the inlet,
    the power converter being configured to send a breaking signal by way of a signal transmission path passing through the electric cable in response to reception of a vehicle abnormality notice from the electric vehicle through the communication path, and the breaker controller being configured to set the connector-side breaker in the open state in response to reception of the breaking signal.

2. The vehicular power supply device according to claim 1, wherein:

the power converter includes a power conversion circuit configured to perform an operation of converting power from an external circuit into power suitable for the electric vehicle and outputting this power to the first power terminal and an operation of converting power received by the first power terminal into power suitable for the external circuit and outputting this power to the external circuit, and a controller configured to control the power conversion circuit; and the controller is configured to stop the power conversion circuit in response to reception of the vehicle abnormality notice.

3. The vehicular power supply device according to claim 1, wherein:

the power converter further includes a first communication terminal and an abnormality notification terminal;

the connection terminal block further includes a primary communication terminal and an abnormality detection terminal;

the plug further includes a secondary communication terminal to be electrically connected to a second communication terminal of the inlet;

the electric vehicular connector further includes a first communication path interconnecting the primary communication terminal and the secondary communication terminal;

the electric cable further includes a second communication path interconnecting the first communication terminal and the primary communication terminal, and a signal line electrically interconnecting the abnormality notification terminal and the abnormality detection terminal;

the communication path is constituted by the first communication terminal, the second communication path, the primary communication terminal, the first communication path, the secondary communication terminal, and the second communication terminal; and the signal transmission path is constituted by the abnormality notification terminal, the signal line, and the abnormality detection terminal.

4. A vehicular power supply device, comprising:

an electric vehicular connector including a connection terminal block including a primary power transmission terminal;

a power converter including a first power terminal; and an electric cable including one or more power supply lines electrically interconnecting the first power terminal of the power converter and the primary power transmission terminal of the electric vehicular connecter, the electric vehicular connector further including a plug including a secondary power transmission terminal to be electrically connected to a second power terminal of an inlet of an electric vehicle, a connector-side breaker which is connected between the primary power transmission terminal and the secondary power transmission terminal, and has a closed state of electrically interconnecting the primary power transmission terminal and the secondary power transmission terminal and an open state of electrically separating the primary power transmission terminal and the secondary power transmission terminal from each other, and a breaker controller configured to set the connector-side breaker in the closed state during a normal state and to set the connector-side breaker in the open state during an abnormal state in which abnormality occurs in the electric vehicle, the power converter being configured to communicate with the electric vehicle by way of a communication path passing through the electric cable, the electric vehicular connector, and the inlet, the electric vehicular connector being configured to send a connector abnormality signal to the electric vehicle by way of a signal transmission path passing through the inlet in response to detection of abnormality of the electric vehicular connector, and the power converter being configured to receive a connector abnormality notice which is to be sent, by way of the communication path, from the electric vehicle in response to reception of the connector abnormality signal.

5. The vehicular power supply device according to claim 4, wherein:

the power converter includes a power conversion circuit configured to perform an operation of converting power from an external circuit into power suitable for the electric vehicle and outputting this power to the first power terminal and an operation of converting power received by the first power terminal into power suitable for the external circuit and outputting this power to the external circuit, and a controller configured to control the power conversion circuit; and the controller is configured to stop the power conversion circuit in response to reception of the connector abnormality signal.

6. The vehicular power supply device according to claim 4, wherein:

the power converter further includes a first communication terminal;

the connection terminal block further includes a primary communication terminal;

the plug further includes a secondary communication terminal to be electrically connected to a second communication terminal of the inlet and an abnormality notification terminal to be electrically connected to an abnormality detection terminal of the inlet;

the electric vehicular connector further includes a first communication path interconnecting the primary communication terminal and the secondary communication terminal;

the electric cable further includes a second communication path interconnecting the first communication terminal and the primary communication terminal;

the communication path is constituted by the first communication terminal, the second communication path, the primary communication terminal, the first communication path, the secondary communication terminal, and the second communication terminal; and the signal transmission path is constituted by the abnormality notification terminal and the abnormality detection terminal.

* * * * *